(12) United States Patent
Tang et al.

(10) Patent No.: US 11,373,433 B2
(45) Date of Patent: Jun. 28, 2022

(54) OPTICAL FINGERPRINT IDENTIFICATION SYSTEM AND OPTICAL FINGERPRINT IDENTIFICATION DEVICE

(71) Applicant: LARGAN PRECISION CO., LTD., Taichung (TW)

(72) Inventors: Hsiang-Chi Tang, Taichung (TW); Chun-Che Hsueh, Taichung (TW); Tsung-Han Tsai, Taichung (TW); Fuh-Shyang Yang, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 0 days.

(21) Appl. No.: 17/023,241

(22) Filed: Sep. 16, 2020

(65) Prior Publication Data
US 2022/0004733 A1    Jan. 6, 2022

(30) Foreign Application Priority Data
Jul. 3, 2020    (TW) .................................. 109122560

(51) Int. Cl.
*G06V 40/13*    (2022.01)
(52) U.S. Cl.
CPC ................................ *G06V 40/1318* (2022.01)
(58) Field of Classification Search
None
See application file for complete search history.

(56) References Cited

U.S. PATENT DOCUMENTS

| | | | |
|---|---|---|---|
| 8,842,367 B2 | 9/2014 | Chen | |
| 9,225,888 B2 | 12/2015 | Huang | |
| 9,279,964 B2 | 3/2016 | Hsiao et al. | |
| 9,829,614 B2 | 11/2017 | Smith et al. | |
| 10,014,341 B1 * | 7/2018 | Hsu | H01L 27/14636 |
| 10,181,070 B2 | 1/2019 | Smith et al. | |
| 10,268,884 B2 | 4/2019 | Jones et al. | |
| 10,311,276 B2 | 6/2019 | Mackay et al. | |
| 10,410,037 B2 | 9/2019 | He et al. | |
| 10,515,253 B2 | 12/2019 | Chen et al. | |

(Continued)

FOREIGN PATENT DOCUMENTS

| | | |
|---|---|---|
| TW | I642175 B | 11/2018 |
| TW | M597916 U | 7/2020 |

OTHER PUBLICATIONS

TW Office Action in Application No. 109122560 dated Mar. 22, 2021.

*Primary Examiner* — Joseph R Haley
(74) *Attorney, Agent, or Firm* — Maschoff Brennan

(57) ABSTRACT

An optical fingerprint identification system includes a base, a photo sensor, a light emitting layer and a cover. The photo sensor is disposed on the base. The light emitting layer is disposed above the photo sensor, and the light emitting layer includes a light emitting element. The cover is disposed above the light emitting layer. The optical fingerprint identification system further includes a condenser unit and a light receiving element between the photo sensor and the cover. The condenser unit is disposed above the photo sensor. The light receiving element is disposed above the condenser unit. The light emitting element is disposed away from the photo sensor, the condenser unit and the light receiving element in a sideway direction that is different from a stack direction of the optical fingerprint identification system.

21 Claims, 16 Drawing Sheets

(56) References Cited

U.S. PATENT DOCUMENTS

| | | |
|---|---|---|
| 2018/0012069 A1 | 1/2018 | Chung et al. |
| 2018/0366593 A1 | 12/2018 | Huang et al. |
| 2019/0278968 A1 | 9/2019 | Yoshii et al. |
| 2020/0065550 A1 | 2/2020 | He et al. |
| 2021/0089741 A1* | 3/2021 | Yeh ........................ G06K 9/209 |
| 2021/0232794 A1* | 7/2021 | Lius ...................... G06F 3/0412 |

* cited by examiner

OPTICAL FINGERPRINT IDENTIFICATION SYSTEM AND OPTICAL FINGERPRINT IDENTIFICATION DEVICE

RELATED APPLICATIONS

This application claims priority to Taiwan Application 109122560, filed on Jul. 3, 2020, which is incorporated by reference herein in its entirety.

BACKGROUND

Technical Field

The present disclosure relates to an optical fingerprint identification system and an optical fingerprint identification device, more particularly to an optical fingerprint identification system applicable to an optical fingerprint identification device.

Description of Related Art

Nowadays, smart mobile devices become more popular than ever. Users can access data via smart mobile devices, and these data may refer to personal information. Therefore, data security of smart mobile devices needs to be significantly raised. Currently, there are many types of security system provided on smart mobile devices in the market, such as graphical password authentication system, fingerprint identification system and facial recognition system; and currently, the fingerprint identification system is most commonly used. Conventionally, capacitive sensors are widely used in the fingerprint identification system; but as for now, in order to match the trend of high screen-to-body ratio in smart mobile devices, the in-display fingerprint identification system is the favorable choice and develops rapidly due to its popularity. There are two types of in-display fingerprint identification systems: optical and ultrasonic solutions. Among the two, the optical solution has advantages of high identification accuracy and high compatibility with compact smart mobile devices, thereby becoming increasingly popular.

The optical in-display fingerprint identification system is usually disposed under the screen. The screen can be a light source to emit light onto user's fingerprint, and then the light can be reflected to a photo sensor disposed under the screen, such that the user's fingerprint can be detected, recorded and then identified. However, this configuration may also capture many unwanted images of light emitting elements in the screen modules when capturing a fingerprint image. These unwanted images may produce the "Moiré effect", which causes poor fingerprint image quality and thus increases difficulty of fingerprint identification.

SUMMARY

According to one aspect of the present disclosure, an optical fingerprint identification system includes a base, a photo sensor, a light emitting layer and a cover. The photo sensor is disposed on the base. The light emitting layer is disposed above the photo sensor, and the light emitting layer includes a light emitting element. The cover is disposed above the light emitting layer. The optical fingerprint identification system further includes a condenser unit and a light receiving element between the photo sensor and the cover. The condenser unit is disposed above the photo sensor. The light receiving element is disposed above the condenser unit. The light emitting element is disposed away from the photo sensor, the condenser unit and the light receiving element in a sideway direction that is different from a stack direction of the optical fingerprint identification system.

According to another aspect of the present disclosure, an optical fingerprint identification system includes a base, a photo sensor, a condenser layer, a light emitting layer, a light receiving element and a cover. The photo sensor is disposed on the base. The condenser layer is disposed above the photo sensor. The light emitting layer is disposed above the condenser layer, and the light emitting layer includes a light emitting element. The light receiving element is disposed above the light emitting layer. The cover is disposed above the light receiving element. The light emitting element is disposed away from the photo sensor and the light receiving element in a sideway direction that is different from a stack direction of the optical fingerprint identification system.

According to another aspect of the present disclosure, an optical fingerprint identification device includes a plurality of light emitting elements, a plurality of light receiving elements and a plurality of photo sensors. The plurality of light emitting elements are disposed at equal intervals respectively in a first direction and a second direction, wherein the first direction is substantially perpendicular to the second direction. The plurality of light receiving elements are located above the plurality of light emitting elements in a stack direction of the optical fingerprint identification device, the plurality of light receiving elements are disposed at equal intervals in the first direction, and each of the plurality of light receiving elements is located between adjacent light emitting elements in the first direction, wherein the stack direction is substantially perpendicular to the first direction and the second direction. The plurality of photo sensors are located below the plurality of light emitting elements in the stack direction, the plurality of photo sensors are disposed at equal intervals in the first direction, and each of the plurality of photo sensors is located between adjacent light emitting elements in the first direction.

BRIEF DESCRIPTION OF THE DRAWINGS

The disclosure can be better understood by reading the following detailed description of the embodiments, with reference made to the accompanying drawings as follows.

DETAILED DESCRIPTION

Figure 1:
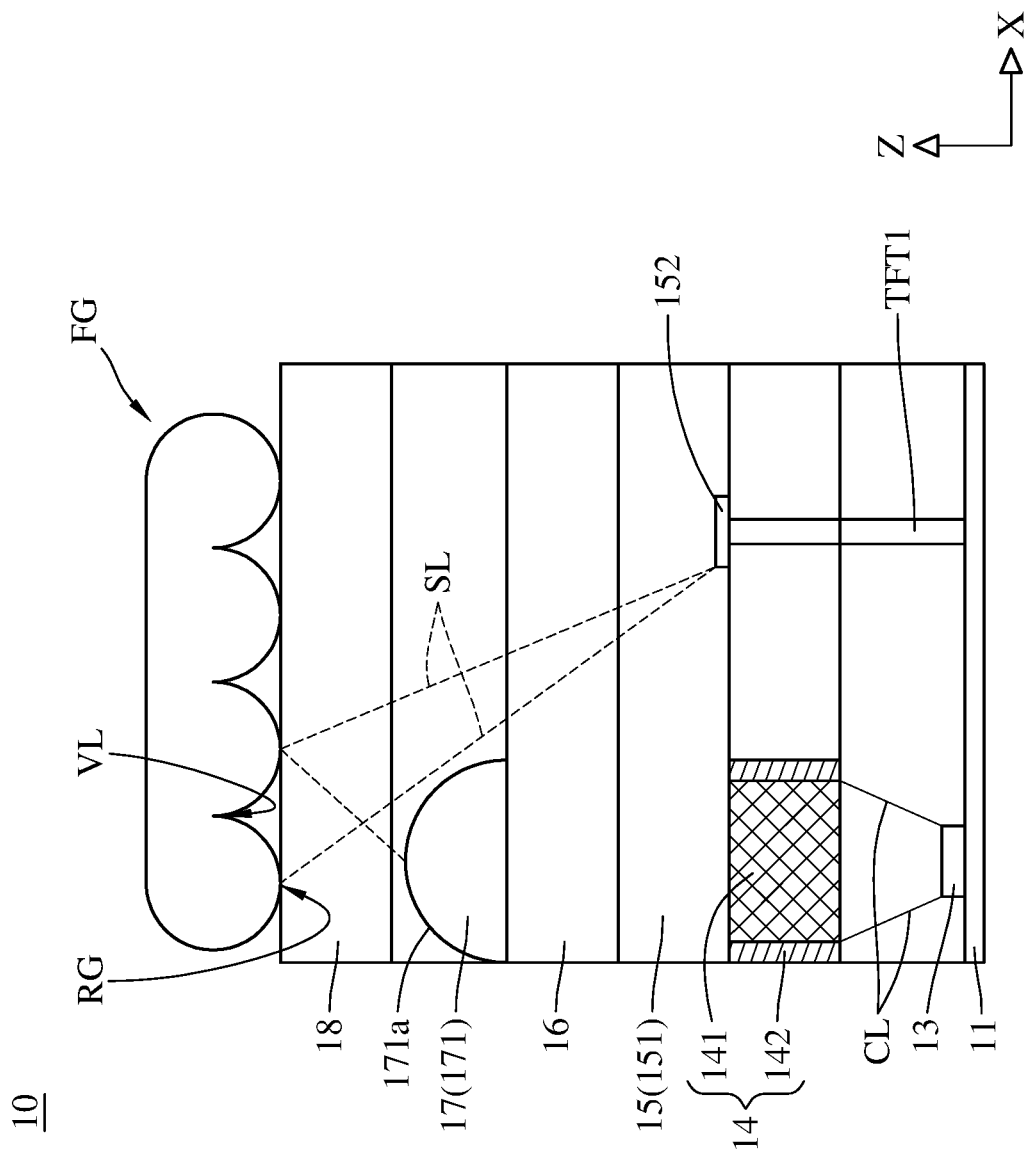
FIG. 1 is a schematic view of an optical fingerprint identification system according to the 1st embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The present disclosure provides an optical fingerprint identification system including a base, a photo sensor, a light emitting layer and a cover. The photo sensor is disposed on the base. The light emitting layer is disposed above the photo sensor, and the light emitting layer includes a light emitting element. The cover is disposed above the light emitting layer. The optical fingerprint identification system further includes a condenser unit and a light receiving element between the photo sensor and the cover. The condenser unit is disposed above the photo sensor. The light receiving element is disposed above the condenser unit. The light emitting element is disposed away from the photo sensor, the condenser unit and the light receiving element in a sideway direction that is different from a stack direction of the optical fingerprint identification system. This configuration is favorable for preventing unwanted image captures of the light emitting element under the screen when imaging a fingerprint, thereby effectively increasing fingerprint image quality, reducing complexity and time of fingerprint identification and thus increasing identification accuracy.

Figure 16:
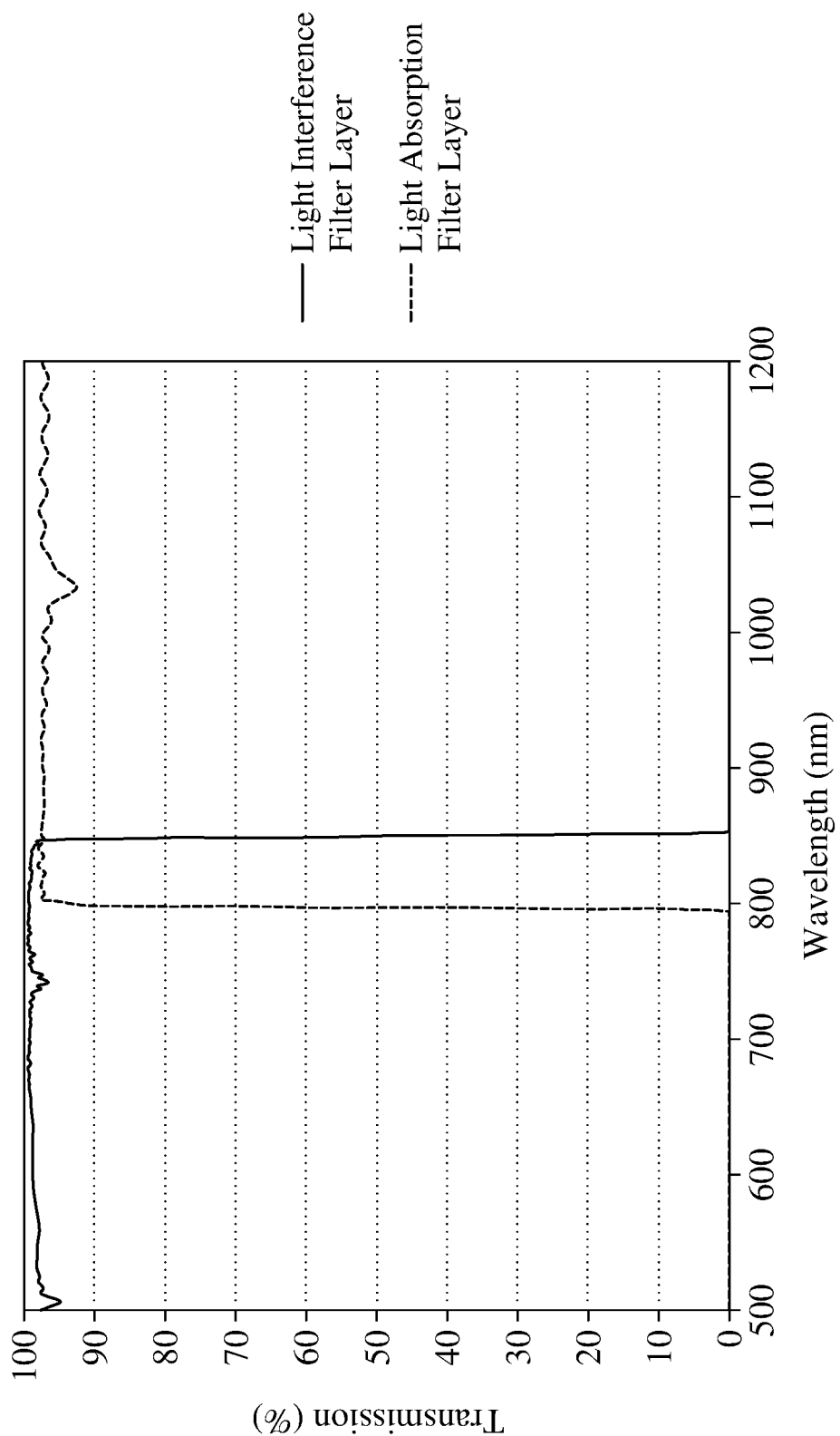
FIG. 16 is a chart showing wavelengths and transmissions of light at an incident angle of 0 degree on a light interference filter layer passing through the light interference filter layer and a light absorption filter layer according to one embodiment of the present disclosure.
Figure 17:
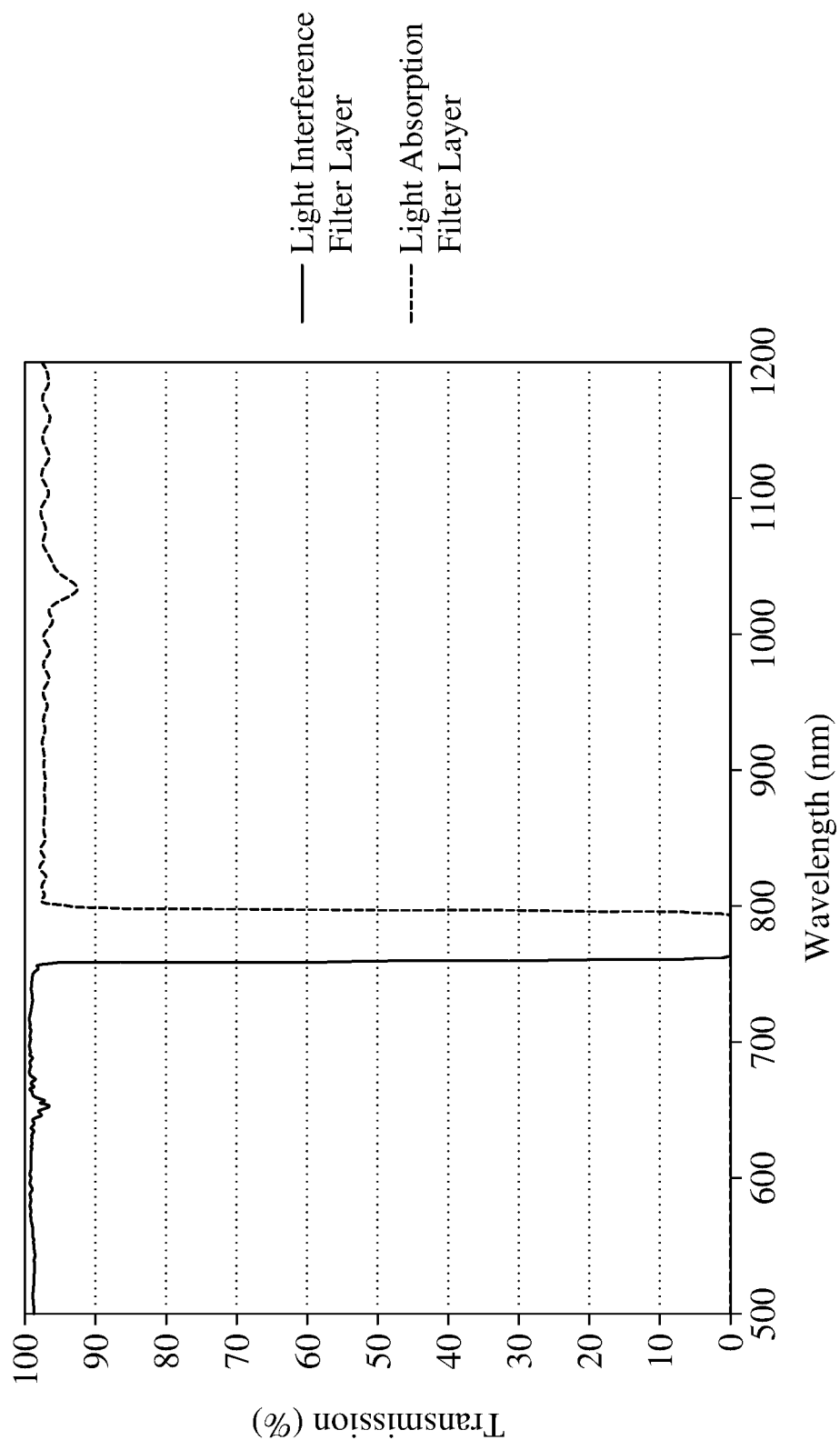
FIG. 17 is a chart showing wavelengths and transmissions of light at an incident angle of 45 degrees on a light interference filter layer passing through the light interference filter layer and a light absorption filter layer according to one embodiment of the present disclosure.

The light receiving element can also include a light interference filter layer and a light absorption filter layer. The light interference filter layer and the light absorption filter layer can be configured as two edgepass filter layers or two bandpass filter layers. The light interference filter layer and the light absorption filter layer can be two filter medium layers or can be formed by coating filter medium on transparent elements. The light interference filter layer can have a filter bandwidth shift corresponding to a change of an incident light angle thereon, and the light absorption filter layer can be a light passable filter layer. The combination of light interference filter layer and light absorption filter layer is favorable for excluding light rays at an overly large incident angle so as to eliminate image noise. Moreover, the light absorption filter layer has a light passing bandwidth ranging between visible and near-infrared spectrum. Please refer to FIG. 16 and FIG. 17, wherein FIG. 16 is a line chart showing wavelengths and transmissions of incident light being perpendicular (incident angle of 0 degree) on the light interference filter layer passing through the light interference filter layer and the light absorption filter layer according to one embodiment of the present disclosure, FIG. 17 is a line chart showing wavelengths and transmissions of incident light at an incident angle of 45 degrees on the light interference filter layer passing through the light interference filter layer and the light absorption filter layer according to one embodiment of the present disclosure, the horizontal axis of the line chart refers to light wavelengths in nanometer (nm), and the vertical axis of the line chart refers to light transmissions in percentage (%). In the embodiment of FIG. 16 and FIG. 17, the light interference filter layer and the light absorption filter layer are configured as two edgepass filter layers, wherein the light interference filter layer is a short pass filter layer, and the light absorption filter layer is a long pass filter layer. As shown in FIG. 16 and FIG. 17, the wavelengths of light capable of passing through the light interference filter layer and the light absorption filter layer are different according to different incident light angles on the light interference filter layer. In detail, please refer to FIG. 16, when the incident light is vertical on the light interference filter layer, light with a wavelength below approximately 850 nm (the upper limit of short pass) can pass through the light interference filter layer, while light with a wavelength above approximately 800 nm (the lower limit of long pass) can pass through the light absorption filter layer. That is, when the incident light enters the filter layers at a right angle, light with a wavelength ranging from approximately 800 nm to approximately 850 nm (near-infrared light) can pass through the light interference filter layer and the light absorption filter layer. Furthermore, please refer to FIG. 17; when light is at an incident angle of 45 degrees, only light with a wavelength below approximately 760 nm can pass through the light interference filter layer. When comparing the lines in the line charts of FIG. 16 and FIG. 17, the line of FIG. 17 showing wavelengths of light capable of passing through the light interference filter layer shifts left, which shows the abovementioned filter bandwidth shift. However, when light is at an incident angle of 45 degrees, the line of FIG. 17 showing wavelengths of light capable of passing through the light absorption filter layer is substantially the same as the line of FIG. 16. As shown in FIG. 17, the wavelengths of light capable of passing through the light interference filter layer and the wavelengths of light capable of passing through the light absorption filter layer do not have any overlapped region. Therefore, light at an incident angle of 45 degrees cannot pass through the light interference filter layer and the light absorption filter layer at the same time, and thereby it is favorable for achieving the abovementioned effect of excluding light rays at an overly large incident angle.

The light receiving element can include a light receiving lens element and can further include a light interference filter layer. The light receiving lens element can include a light absorption material being a light passing filter material. The light interference filter layer can be adhered to a lens surface of the light receiving lens element through a coating process, and the light interference filter layer is configured to provide a filter bandwidth shift according to a change of an incident light angle thereon. Therefore, it is favorable for excluding light rays at an overly large incident angle so as to eliminate image noise.

The condenser unit can include a medium layer and a reflection layer, and the reflection layer surrounds the outer rim of the medium layer. Therefore, it is favorable for utilizing a proper light transmission medium to reduce the required configuration length and thickness of the optical fingerprint identification system, thereby allowing applications in thin electronic devices. In addition, the reflection layer can prevent unwanted light leaks outside of the medium layer so as to enhance the light transmission inside the medium layer.

The condenser unit can further include an upper medium layer and an upper reflection layer, the upper reflection layer surrounds the outer rim of the upper medium layer, and the upper medium layer and the upper reflection layer are located above the medium layer and the reflection layer. Therefore, it is favorable for enhancing light convergence so as to further reduce the total track length.

According to the present disclosure, the optical fingerprint identification system can further include a light guiding layer disposed above the light emitting layer. Therefore, it is favorable for taking the light guiding layer as a secondary light source so as to reduce overall power consumption.

The light emitting element can emit red light or green light. Therefore, it is favorable for providing information from photoplethysmogram so as to confirm the identified object is from a real person.

The light receiving element and the photo sensor are aligned with each other in the stack direction of the optical fingerprint identification system. In other words, the light receiving element has an orthographic projection on the base overlapping an orthographic projection of the photo sensor on the base. Therefore, it is favorable for the light receiving element sufficiently transmitting the light to the photo sensor so as to increase the light sensing amount of the photo sensor.

The light emitting element can be disposed at the opposite side of the photo sensor, the condenser unit and the light receiving element in the sideway direction. Therefore, it is favorable for the photo sensor, the condenser unit and the light receiving element to form an image identification unit, which can be easily combined into one module.

The light emitting layer can further include a display unit, wherein the display unit includes the light emitting element, and the light emitting element is an organic light emitting diode (OLED). Therefore, it is favorable for achieving the configuration of an in-display fingerprint identification system.

The photo sensor and the light emitting element can be connected via a thin-film-transistor (TFT) circuitry structure. Therefore, it is favorable for synchronously turning on/off the photo sensor and the light emitting element via the connection between the light emitting element and the photo sensor so as to easily emit and capture light, thereby eliminating unwanted optical signals from stray light as well as crosstalk issues and thus increasing identification accuracy. Moreover, there can be a plurality of photo sensors to form an image sensor including complementary metal-oxide-semiconductors (CMOSs). Therefore, it is favorable for allowing light passing through a plurality of condenser units to generate an image from the plurality of photo sensors.

According to the present disclosure, the optical fingerprint identification system can further include a touch layer located between the light receiving element and the condenser unit, and the touch layer can be disposed above, below or into the structure of the light emitting layer. Therefore, it is favorable for providing a touch function as well as verification whether the detected object is from a live person.

When a full width at half maximum of the light passing bandwidth of the light interference filter layer or the light absorption filter layer is FWHM, the following condition can be satisfied: FWHM<100 [nm]. Therefore, it is favorable restricting the range of the light passing bandwidth so as to control the light incident angle. Moreover, the following condition can also be satisfied: FWHM<50 [nm].

When a refractive index of the medium layer is nA, the following condition can be satisfied: $1.60<nA<5.0$. Therefore, it is favorable for light converging to reduce the total optical path and the thickness of the optical fingerprint identification system. Moreover, the following condition can also be satisfied: $1.80<nA<3.0$. Moreover, a proper medium layer material can be chosen based on the requirement of light convergence capability and manufacture difficulty, and thus the following condition can also be satisfied: $nA=1.61$. Moreover, the following condition can also be satisfied: $nA=1.77$. Moreover, the following condition can also be satisfied: $nA=1.85$. Moreover, the following condition can also be satisfied: $nA=2.42$.

When the refractive index of the medium layer is nA, and a refractive index of the reflection layer is nR, the following condition can be satisfied: $nR<nA$. Therefore, it is favorable for generating total reflection inside the medium layer so as to increase light transmission efficiency. Moreover, the following conditions can also be satisfied: $nA=1.85$; and $nR=1.56$.

When the refractive index of the medium layer is nA, and a refractive index of the upper medium layer is nB, the following condition is satisfied: $nB<nA$. Therefore, it is favorable for increasing light convergence and preventing total reflection between the medium layer and the upper medium layer. Moreover, the following conditions can also be satisfied: $nA=1.85$; and $nB=1.77$.

According to the present disclosure, the condenser unit can include a condenser lens element. When a refractive index of the condenser lens element is nL1, the following condition can be satisfied: $1.60<nL1<2.50$. Therefore, it is favorable for providing sufficient refractive power so as to reduce the total track length of the optical fingerprint identification system. Moreover, the following condition can also be satisfied: $nL1=1.61$. Moreover, the following condition can also be satisfied: $nL1=1.75$. Moreover, the following condition can also be satisfied: $nL1=2.42$.

When the refractive index of the condenser lens element is nL1, a refractive index of the light receiving lens element is nL2, a refractive index of one of the condenser lens element and the light receiving lens element is nLi, a glass transition temperature value in Celsius scale of a material of the condenser lens element is Tg1, a glass transition temperature value in Celsius scale of a material of the light receiving lens element is Tg2, and a glass transition temperature value in Celsius scale of a material of one of the condenser lens element and the light receiving lens element is Tgi, at least one of the condenser lens element and the light receiving lens element can satisfy the following condition: $0<100\times nLi/(650-Tgi)<8$, wherein i=1 or 2. Therefore, it is favorable for providing sufficient light convergence and reducing difficulty of molding the lens element. Moreover, at least one of the condenser lens element and the light receiving lens element can also satisfy the following condition: $0.5<100\times nLi/(650-Tgi)<6$, wherein i=1 or 2. Moreover, at least one of the condenser lens element and the light receiving lens element can also satisfy the following condition: $0.65<100\times nLi/(650-Tgi)<5.2$, wherein i=1 or 2. Moreover, at least one of the condenser lens element and the light receiving lens element can also satisfy the following condition: $100\times nLi/(650-Tgi)=0.68$, wherein i=1 or 2. Moreover, at least one of the condenser lens element and the light receiving lens element can also satisfy the following condition: $100\times nLi/(650-Tgi)=0.85$, wherein i=1 or 2. Moreover, at least one of the condenser lens element and the light receiving lens element can also satisfy the following condition: $100\times nLi/(650-Tgi)=4.13$, wherein i=1 or 2. Moreover, at least one of the condenser lens element and the light receiving lens element can also satisfy the following condition: $100\times nLi/(650-Tgi)=5.15$, wherein i=1 or 2. In the specification of the present disclosure, the temperature values in Celsius scale used in "Tg1, Tg2 and Tgi" of the conditions here are only for describing the numerical values in Celsius scale of the materials when reaching the glass transition temperature thereof, and thus "Tg1, Tg2 and Tgi" are dimensionless and unit-less quantities.

The present disclosure provides another optical fingerprint identification system including a base, a photo sensor, a condenser layer, a light emitting layer, a light receiving element and a cover. The photo sensor is disposed on the base. The condenser layer is disposed above the photo sensor. The light emitting layer is disposed above the condenser layer, and the light emitting layer includes a light emitting element. The light receiving element is disposed above the light emitting layer. The cover is disposed above the light receiving element. The light emitting element is disposed away from the photo sensor and the light receiving element in a sideway direction that is different from a stack direction of the optical fingerprint identification system. This configuration is favorable for utilizing the condenser layer instead of condenser units so as to reduce the complexity of overall manufacturing processes.

The present disclosure provides an optical fingerprint identification device including a plurality of light emitting elements, a plurality of light receiving elements and a plurality of photo sensors. The plurality of light emitting elements are disposed at equal intervals respectively in a first direction and a second direction, wherein the first direction is substantially perpendicular to the second direction. The plurality of light receiving elements are located above the plurality of light emitting elements in a stack direction of the optical fingerprint identification device, the plurality of light receiving elements are disposed at equal intervals in the first direction, and each of the plurality of light receiving elements is located between adjacent light emitting elements in the first direction, wherein the stack direction is substantially perpendicular to the first direction and the second direction. The plurality of photo sensors are located below the plurality of light emitting elements in the stack direction, the plurality of photo sensors are disposed at equal intervals in the first direction, and each of the plurality of photo sensors is located between adjacent light emitting elements in the first direction. This wafer level optic configuration is favorable for reducing the overall size of the optical fingerprint identification device so as to provide a simplified integration with the current display manufacturing process.

According to the present disclosure, the aforementioned features and conditions can be utilized in numerous combinations so as to achieve corresponding effects.

According to the above description of the present disclosure, the following specific embodiments are provided for further explanation.

1st Embodiment

Please refer to FIG. 1, which is a schematic view of an optical fingerprint identification system according to the 1st embodiment of the present disclosure. In this embodiment, the optical fingerprint identification system 10 includes a base 11, a photo sensor 13, a condenser unit 14, a light emitting layer 15, a touch layer 16, a light receiving element 17 and a cover 18. The photo sensor 13 is disposed on the base 11 in a stack direction Z. The condenser unit 14 is disposed above the photo sensor 13 in the stack direction Z. The light emitting layer 15 is disposed above the photo sensor 13 and the condenser unit 14 in the stack direction Z. The touch layer 16 is disposed above the light emitting layer 15 in the stack direction Z. The light receiving element 17 is disposed above the condenser unit 14, the light emitting layer 15 and the touch layer 16 in the stack direction Z, such that the touch layer 16 is located between the light receiving element 17 and the condenser unit 14. The cover 18 is disposed above the light emitting layer 15 and the light receiving element 17 in the stack direction Z.

Specifically, the condenser unit 14 is located between the photo sensor 13 and the cover 18. The condenser unit 14 includes a medium layer 141 and a reflection layer 142, wherein the reflection layer 142 surrounds the outer rim of the medium layer 141 with a central axis passing through the geometric center of the medium layer 141 in the stack direction Z.

The light receiving element 17 is located between the photo sensor 13 and the cover 18. The light receiving element 17 and the photo sensor 13 are aligned with each other in the stack direction Z. In other words, the light receiving element 17 has an orthographic projection on the photo sensor 13 which is on the base 11. The light receiving element 17 includes a light receiving lens element 171. The light receiving lens element 171 has a convex lens surface 171a facing the cover 18 in the stack direction Z.

The light emitting layer 15 includes a display unit 151, and the display unit 151 includes a light emitting element 152. The light emitting element 152 is disposed away from the photo sensor 13, the condenser unit 14 and the light receiving element 17 in a sideway direction that is different from the stack direction Z. Specifically, the photo sensor 13, the condenser unit 14 and the light receiving element 17 are disposed on the opposite side of the light emitting element 152 in a first direction X that can be viewed as the sideway direction. In addition, the light emitting element 152 is, for example, an organic light emitting diode and thus can be used as a light source to emit red light or green light.

The light emitting element 152 and the base 11 are connected via a thin-film-transistor circuitry structure TFT1, and the light emitting element 152 and the photo sensor 13 are indirectly connected via the thin-film-transistor circuitry structure TFT1 and the base 11.

When a refractive index of the medium layer 141 is nA, and a refractive index of the reflection layer 142 is nR, the following conditions are satisfied: nA=1.61, 1.77, 1.85 or 2.42; and nR=1.56.

When a refractive index of the light receiving lens element 171 is nL2, and a glass transition temperature value in Celsius scale of a material of the light receiving lens element 171 is Tg2, the following condition is satisfied: 100×nL2/(650−Tg2)=0.68, 0.85, 4.13 or 5.15.

When user's finger FG is placed on the cover 18, the light emitting element 152 can emit a sensing light SL towards the finger FG. Since the finger FG has fingerprint patterns, the finger FG has a valley portion VL and a ridge portion RG on the surface thereof. The sensing light SL can be reflected off the valley portion VL and the ridge portion RG (for simplicity, only the sensing light SL reflected off the ridge portion RG would be illustrated in the drawings of this and the following embodiments), transmitted to the convex lens surface 171a of the light receiving lens element 171, and then transmitted to the condenser unit 14 to become a converging light CL towards the photo sensor 13. The converging light CL converges on the photo sensor 13 to generate image data, and the image data is transmitted to a processor (not shown). Image data from several optical fingerprint identification systems would be collected to form an image for the processor to perform an identification process.

2nd Embodiment

Figure 2:
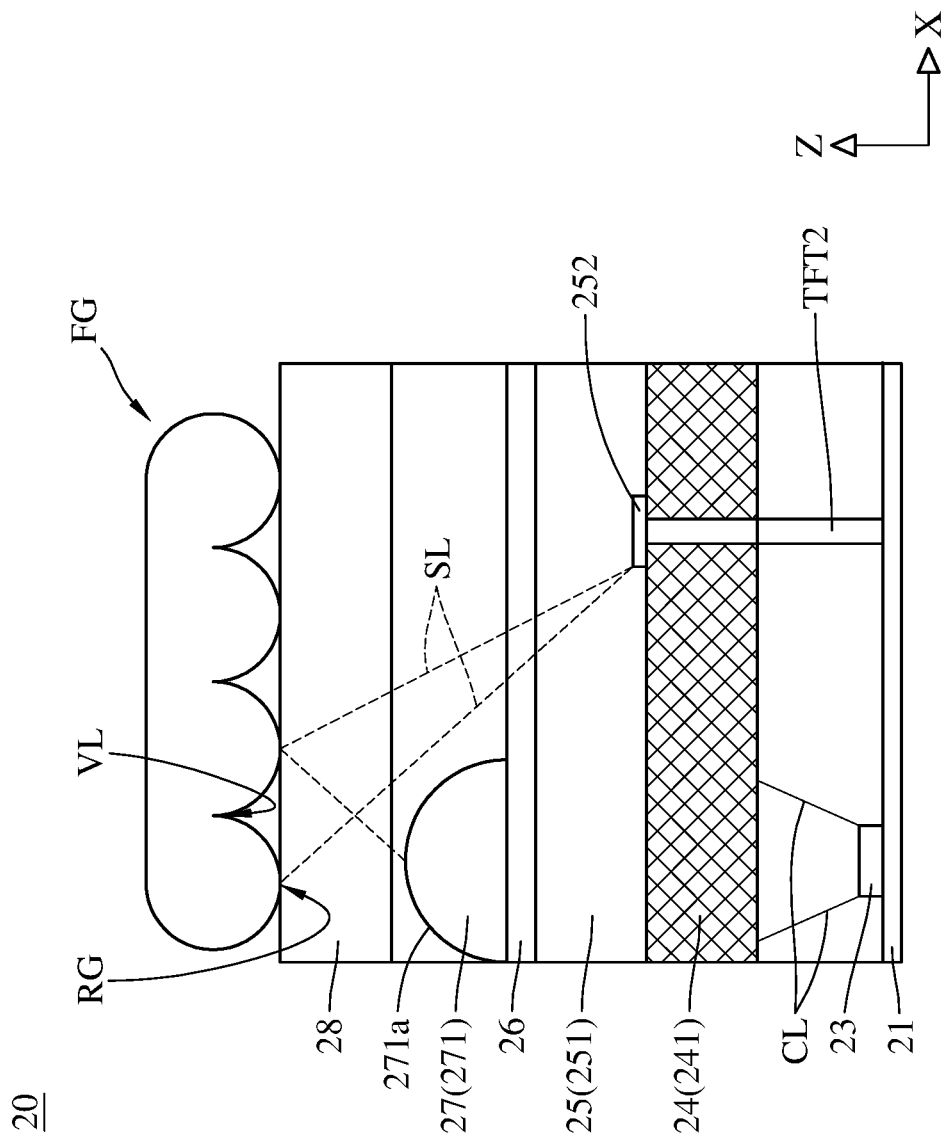
FIG. 2 is a schematic view of an optical fingerprint identification system according to the 2nd embodiment of the present disclosure.

Please refer to FIG. 2, which is a schematic view of an optical fingerprint identification system according to the 2nd embodiment of the present disclosure. In this embodiment, the optical fingerprint identification system 20 includes a base 21, a photo sensor 23, a condenser layer 24, a light emitting layer 25, a touch layer 26, a light receiving element 27 and a cover 28. The photo sensor 23 is disposed on the base 21 in a stack direction Z. The condenser layer 24 is disposed above the photo sensor 23 in the stack direction Z. The light emitting layer 25 is disposed above the photo sensor 23 and the condenser layer 24 in the stack direction Z. The touch layer 26 is integrated in the structure of the light emitting layer 25 and thus located in the same layer as the light emitting layer 25. The light receiving element 27 is disposed above the condenser layer 24, the light emitting layer 25 and the touch layer 26 in the stack direction Z, such that the touch layer 26 is located between the light receiving element 27 and the condenser layer 24. The cover 28 is disposed above the light emitting layer 25 and the light receiving element 27 in the stack direction Z.

Specifically, the condenser layer 24 is located between the photo sensor 23 and the cover 28. The condenser layer 24 includes a medium 241. Since the medium 241 is substantially distributed to the overall condenser layer 24, the condenser layer 24 can be referred as a condenser medium layer.

The light receiving element 27 is located between the photo sensor 23 and the cover 28. The light receiving element 27 and the photo sensor 23 are aligned with each other in the stack direction Z. In other words, the light receiving element 27 has an orthographic projection on the photo sensor 23 which is on the base 21. The light receiving element 27 includes a light receiving lens element 271. The light receiving lens element 271 has a convex lens surface 271a facing the cover 28 in the stack direction Z.

The light emitting layer 25 includes a display unit 251, and the display unit 251 includes a light emitting element 252. The light emitting element 252 is disposed away from the photo sensor 23 and the light receiving element 27 in a sideway direction that is different from the stack direction Z. Specifically, the photo sensor 23 and the light receiving element 27 are disposed on the opposite side of the light emitting element 252 in a first direction X that can be viewed as the sideway direction. In addition, the light emitting element 252 is, for example, an organic light emitting diode and thus can be used as a light source to emit red light or green light.

The light emitting element 252 and the base 21 are connected via a thin-film-transistor circuitry structure TFT2, and the light emitting element 252 and the photo sensor 23 are indirectly connected via the thin-film-transistor circuitry structure TFT2 and the base 21.

When a refractive index of the medium 241 is nA, the following condition is satisfied: nA=1.61, 1.77, 1.85 or 2.42.

When a refractive index of the light receiving lens element 271 is nL2, and a glass transition temperature value in Celsius scale of a material of the light receiving lens element 271 is Tg2, the following condition is satisfied: 100×nL2/(650−Tg2)=0.68, 0.85, 4.13 or 5.15.

When user's finger FG is placed on the cover 28, the light emitting element 252 can emit a sensing light SL towards the finger FG. Since the finger FG has fingerprint patterns, the finger FG has a valley portion VL and a ridge portion RG on the surface thereof. The sensing light SL can be reflected off the valley portion VL and the ridge portion RG, transmitted to the convex lens surface 271a of the light receiving lens element 271, and then transmitted to the condenser layer 24 to become a converging light CL towards the photo sensor 23. The converging light CL converges on the photo sensor 23 to generate image data, and the image data is transmitted to a processor (not shown). Image data from several optical fingerprint identification systems would be collected to form an image for the processor to perform an identification process.

3rd Embodiment

Figure 3:
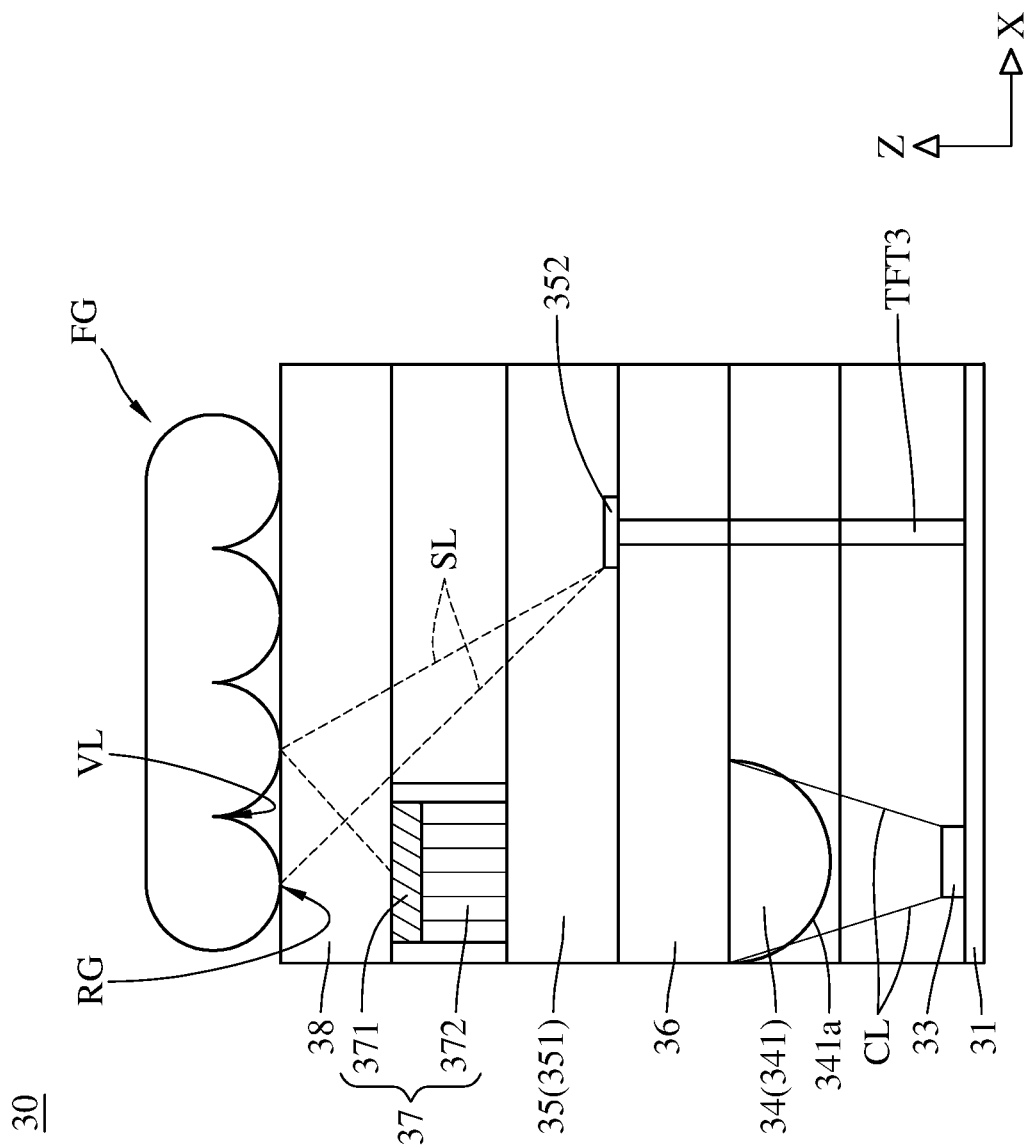
FIG. 3 is a schematic view of an optical fingerprint identification system according to the 3rd embodiment of the present disclosure.

Please refer to FIG. 3, which is a schematic view of an optical fingerprint identification system according to the 3rd embodiment of the present disclosure. In this embodiment, the optical fingerprint identification system 30 includes a base 31, a photo sensor 33, a condenser unit 34, a light emitting layer 35, a touch layer 36, a light receiving element 37 and a cover 38. The photo sensor 33 is disposed on the base 31 in a stack direction Z. The condenser unit 34 is disposed above the photo sensor 33 in the stack direction Z. The light emitting layer 35 is disposed above the photo sensor 33 and the condenser unit 34 in the stack direction Z. The touch layer 36 is disposed below the light emitting layer 35 in the stack direction Z. The light receiving element 37 is disposed above the condenser unit 34, the touch layer 36 and the light emitting layer 35 in the stack direction Z, such that the touch layer 36 is located between the light receiving element 37 and the condenser unit 34. The cover 38 is disposed above the light emitting layer 35 and the light receiving element 37 in the stack direction Z.

Specifically, the condenser unit 34 is located between the photo sensor 33 and the cover 38. The condenser unit 34 includes a condenser lens element 341. The condenser lens element 341 has a convex lens surface 341a facing the base 31 in the stack direction Z.

The light receiving element 37 is located between the photo sensor 33 and the cover 38. The light receiving element 37 and the photo sensor 33 are aligned with each other in the stack direction Z. In other words, the light receiving element 37 has an orthographic projection on the photo sensor 33 which is on the base 31. The light receiving element 37 includes a light interference filter layer 371 and a light absorption filter layer 372, and the light absorption filter layer 372 is disposed between the light interference filter layer 371 and the condenser unit 34. There is a reinforcement structure (not numbered) located outside the light interference filter layer 371 and the light absorption filter layer 372, and the reinforcement structure is able to fix the light interference filter layer 371 and the light absorption filter layer 372. The light absorption filter layer 372 is a light passable filter layer, and the light absorption filter layer 372 has a light passing bandwidth ranging between visible and near-infrared spectrum.

The light emitting layer 35 includes a display unit 351, and the display unit 351 includes a light emitting element 352. The light emitting element 352 is disposed away from the photo sensor 33, the condenser unit 34 and the light receiving element 37 in a sideway direction that is different from the stack direction Z. Specifically, the photo sensor 33, the condenser unit 34 and the light receiving element 37 are disposed on the opposite side of the light emitting element 352 in a first direction X which can be viewed as the sideway direction. In addition, the light emitting element 352 is, for example, an organic light emitting diode and thus can be used as a light source to emit red light or green light.

The light emitting element 352 and the base 31 are connected via a thin-film-transistor circuitry structure TFT3, and the light emitting element 352 and the photo sensor 33 are indirectly linked via the thin-film-transistor circuitry structure TFT3 and the base 31.

When a full width at half maximum of the light passing bandwidth of the light interference filter layer 371 or the light absorption filter layer 372 is FWHM, the following condition is satisfied: FWHM<100 [nm] or FWHM<40 [nm].

When a refractive index of the condenser lens element 341 is nL1, the following condition is satisfied: nL1=1.61, 1.75 or 2.42.

When the refractive index of the condenser lens element 341 is nL1, and a glass transition temperature value in Celsius scale of a material of the condenser lens element 341 is Tg1, the following condition is satisfied: 100×nL1/(650−Tg1)=0.68, 0.85, 4.13 or 5.15.

When user's finger FG is placed on the cover 38, the light emitting element 352 can emit a sensing light SL towards the finger FG. Since the finger FG has fingerprint patterns, the finger FG has a valley portion VL and a ridge portion RG on the surface thereof. The sensing light SL can be reflected off the valley portion VL and the ridge portion RG, transmitted to the light interference filter layer 371 and the light absorption filter layer 372, and then transmitted to the convex lens surface 341a of the condenser lens element 341 to become a converging light CL towards the photo sensor 33. The converging light CL converges on the photo sensor 33 to generate image data, and the image data is transmitted to a processor (not shown). Image data from several optical fingerprint identification systems would be collected to form an image for the processor to perform an identification process.

4th Embodiment

Figure 4:
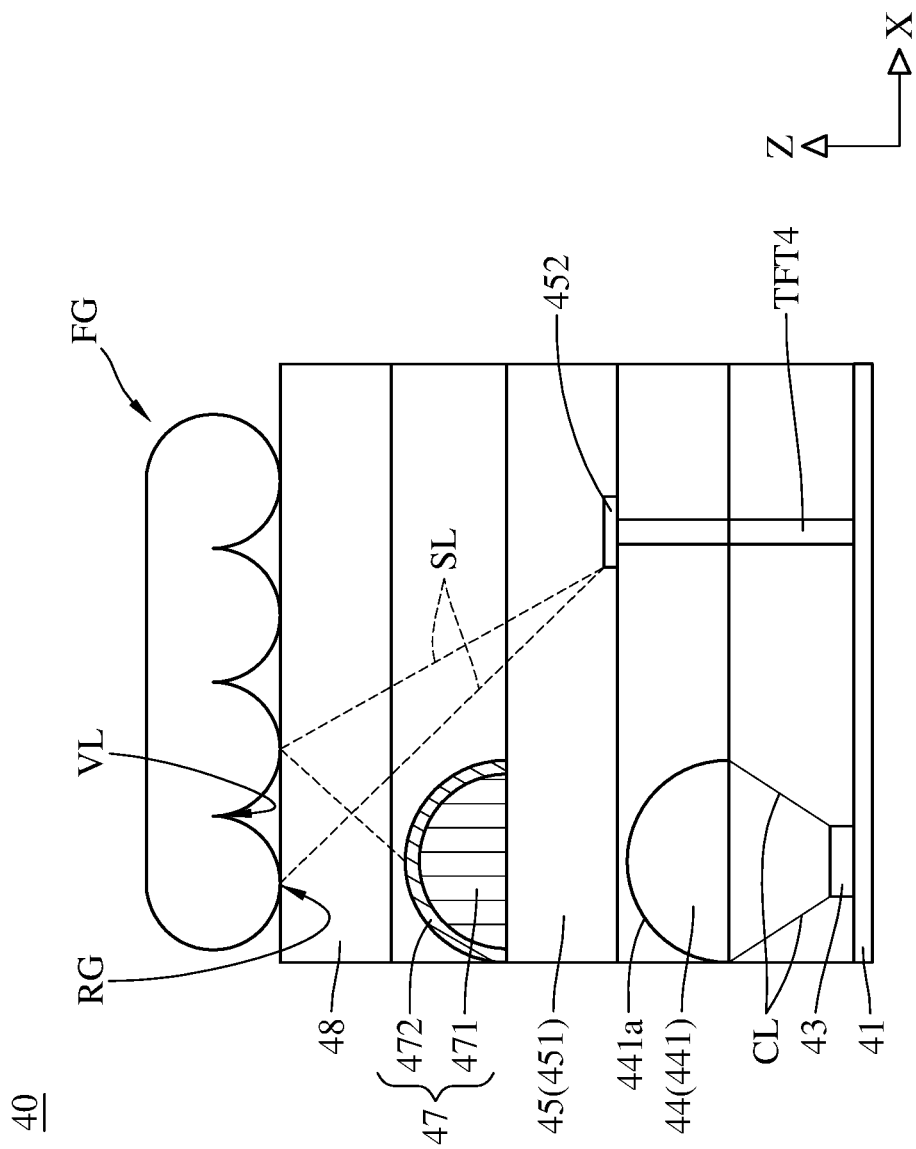
FIG. 4 is a schematic view of an optical fingerprint identification system according to the 4th embodiment of the present disclosure.

Please refer to FIG. 4, which is a schematic view of an optical fingerprint identification system according to the 4th embodiment of the present disclosure. In this embodiment, the optical fingerprint identification system 40 includes a base 41, a photo sensor 43, a condenser unit 44, a light emitting layer 45, a light receiving element 47 and a cover 48. The photo sensor 43 is disposed on the base 41 in a stack direction Z. The condenser unit 44 is disposed above the photo sensor 43 in the stack direction Z. The light emitting layer 45 is disposed above the photo sensor 43 and the condenser unit 44 in the stack direction Z. The light receiving element 47 is disposed above the condenser unit 44 and the light emitting layer 45 in the stack direction Z. The cover 48 is disposed above the light emitting layer 45 and the light receiving element 47 in the stack direction Z.

Specifically, the condenser unit 44 is located between the photo sensor 43 and the cover 48. The condenser unit 44 includes a condenser lens element 441. The condenser lens element 441 has a convex lens surface 441a facing the cover 48 in the stack direction Z.

The light receiving element 47 is located between the photo sensor 43 and the cover 48. The light receiving element 47 and the photo sensor 43 are aligned with each other in the stack direction Z. In other words, the light receiving element 47 has an orthographic projection on the photo sensor 43 which is on the base 41. The light receiving element 47 includes a light receiving lens element 471 and a light interference filter layer 472. The light receiving lens element 471 includes a light absorption material being a light passing filter material. The light interference filter layer 472 is disposed on the lens surface (not numbered) of the light receiving lens element 471 by, for example, coating or plating, and the light interference filter layer 472 is located between the light receiving lens element 471 and the cover 48.

The light emitting layer 45 includes a display unit 451, and the display unit 451 includes a light emitting element 452. The light emitting element 452 is disposed away from the photo sensor 43, the condenser unit 44 and the light receiving element 47 in a sideway direction that is different from the stack direction Z. Specifically, the photo sensor 43, the condenser unit 44 and the light receiving element 47 are disposed on the opposite side of the light emitting element 452 in a first direction X that can be viewed as the sideway direction. In addition, the light emitting element 452 is, for example, an organic light emitting diode and thus can be used as a light source to emit red light or green light.

The light emitting element 452 and the base 41 are connected via a thin-film-transistor circuitry structure TFT4, and the light emitting element 452 and the photo sensor 43 are indirectly connected via the thin-film-transistor circuitry structure TFT4 and the base 41.

When a refractive index of the condenser lens element 441 is nL1, the following condition is satisfied: nL1=1.61, 1.75 or 2.42.

When the refractive index of the condenser lens element 441 is nL1, and a glass transition temperature value in Celsius scale of a material of the condenser lens element 441 is Tg1, the following condition is satisfied: 100×nL1/(650−Tg1)=0.68, 0.85, 4.13 or 5.15.

When a refractive index of the light receiving lens element 471 is nL2, and a glass transition temperature value in Celsius scale of a material of the light receiving lens element 471 is Tg2, the following condition is satisfied: 100×nL2/(650−Tg2)=0.68, 0.85, 4.13 or 5.15.

When user's finger FG is placed on the cover 48, the light emitting element 452 can emit a sensing light SL towards the finger FG. Since the finger FG has fingerprint patterns, the finger FG has a valley portion VL and a ridge portion RG on the surface thereof. The sensing light SL can be reflected off the valley portion VL and the ridge portion RG, transmitted to the light interference filter layer 472 and the light receiving lens element 471, and then transmitted to the convex lens surface 441a of the condenser lens element 441 to become a converging light CL towards the photo sensor 43. The converging light CL converges on the photo sensor 43 to generate image data, and the image data is transmitted to a processor (not shown). Image data from several optical fingerprint identification systems would be collected to form an image for the processor to perform an identification process.

5th Embodiment

Figure 5:
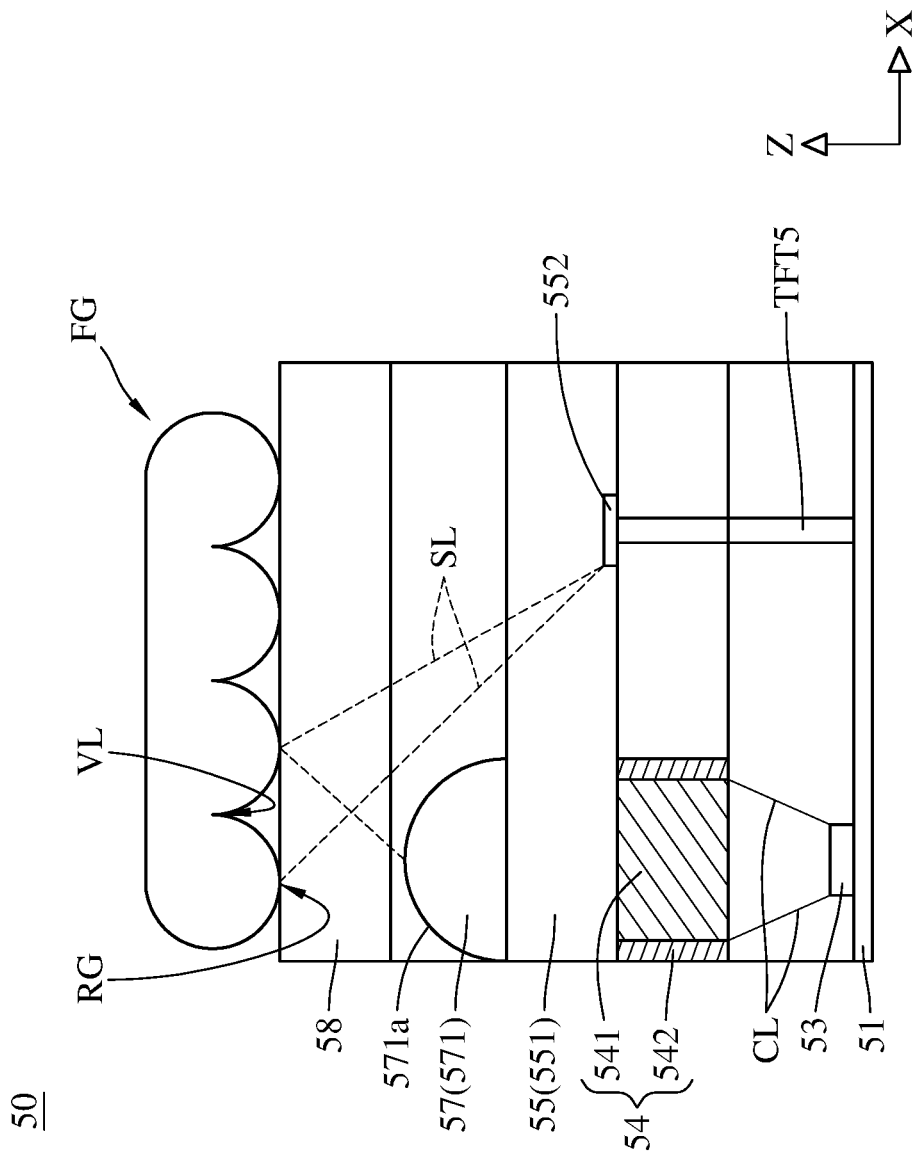
FIG. 5 is a schematic view of an optical fingerprint identification system according to the 5th embodiment of the present disclosure.

Please refer to FIG. 5, which is a schematic view of an optical fingerprint identification system according to the 5th embodiment of the present disclosure. In this embodiment, the optical fingerprint identification system 50 includes a base 51, a photo sensor 53, a condenser unit 54, a light emitting layer 55, a light receiving element 57 and a cover 58. The photo sensor 53 is disposed on the base 51 in a stack direction Z. The condenser unit 54 is disposed above the photo sensor 53 in the stack direction Z. The light emitting layer 55 is disposed above the photo sensor 53 and the condenser unit 54 in the stack direction Z. The light receiving element 57 is disposed above the condenser unit 54 and the light emitting layer 55 in the stack direction Z. The cover 58 is disposed above the light emitting layer 55 and the light receiving element 57 in the stack direction Z.

Specifically, the condenser unit 54 is located between the photo sensor 53 and the cover 58. The condenser unit 54 includes a medium layer 541 and a reflection layer 542, wherein the reflection layer 542 surrounds the outer rim of the medium layer 541 with a central axis passing through the geometric center of the medium layer 541 in the stack direction Z.

The light receiving element 57 is located between the photo sensor 53 and the cover 58. The light receiving element 57 and the photo sensor 53 are aligned with each other in the stack direction Z. In other words, the light receiving element 57 has an orthographic projection on the photo sensor 53 which is on the base 51. The light receiving element 57 includes a light receiving lens element 571. The light receiving lens element 571 has a convex lens surface 571a facing the cover 58 in the stack direction Z.

The light emitting layer 55 includes a display unit 551, and the display unit 551 includes a light emitting element 552. The light emitting element 552 is disposed away from the photo sensor 53, the condenser unit 54 and the light receiving element 57 in a sideway direction that is different from the stack direction Z. Specifically, the photo sensor 53, the condenser unit 54 and the light receiving element 57 are disposed on the opposite side of the light emitting element 552 in a first direction X that can be viewed as the sideway direction. In addition, the light emitting element 552 is, for example, an organic light emitting diode and thus can be used as a light source to emit red light or green light.

The light emitting element 552 and the base 51 are connected via a thin-film-transistor circuitry structure TFT5, and the light emitting element 552 and the photo sensor 53 are indirectly connected via the thin-film-transistor circuitry structure TFT5 and the base 51.

When a refractive index of the medium layer 541 is nA, and a refractive index of the reflection layer 542 is nR, the following conditions are satisfied: nA=1.61, 1.77, 1.85 or 2.42; and nR=1.56.

When a refractive index of the light receiving lens element 571 is nL2, and a glass transition temperature value in Celsius scale of a material of the light receiving lens element 571 is Tg2, the following condition is satisfied: 100×nL2/(650−Tg2)=0.68, 0.85, 4.13 or 5.15.

When user's finger FG is placed on the cover 58, the light emitting element 552 can emit a sensing light SL towards the finger FG. Since the finger FG has fingerprint patterns, the finger FG has a valley portion VL and a ridge portion RG on the surface thereof. The sensing light SL can be reflected off the valley portion VL and the ridge portion RG, transmitted to the convex lens surface 571a of the light receiving lens element 571, and then transmitted to the condenser unit 54 to become a converging light CL towards the photo sensor 53. The converging light CL converges on the photo sensor 53 to generate image data, and the image data is transmitted to a processor (not shown). Image data from several optical fingerprint identification systems would be collected to form an image for the processor to perform an identification process.

6th Embodiment

Figure 6:
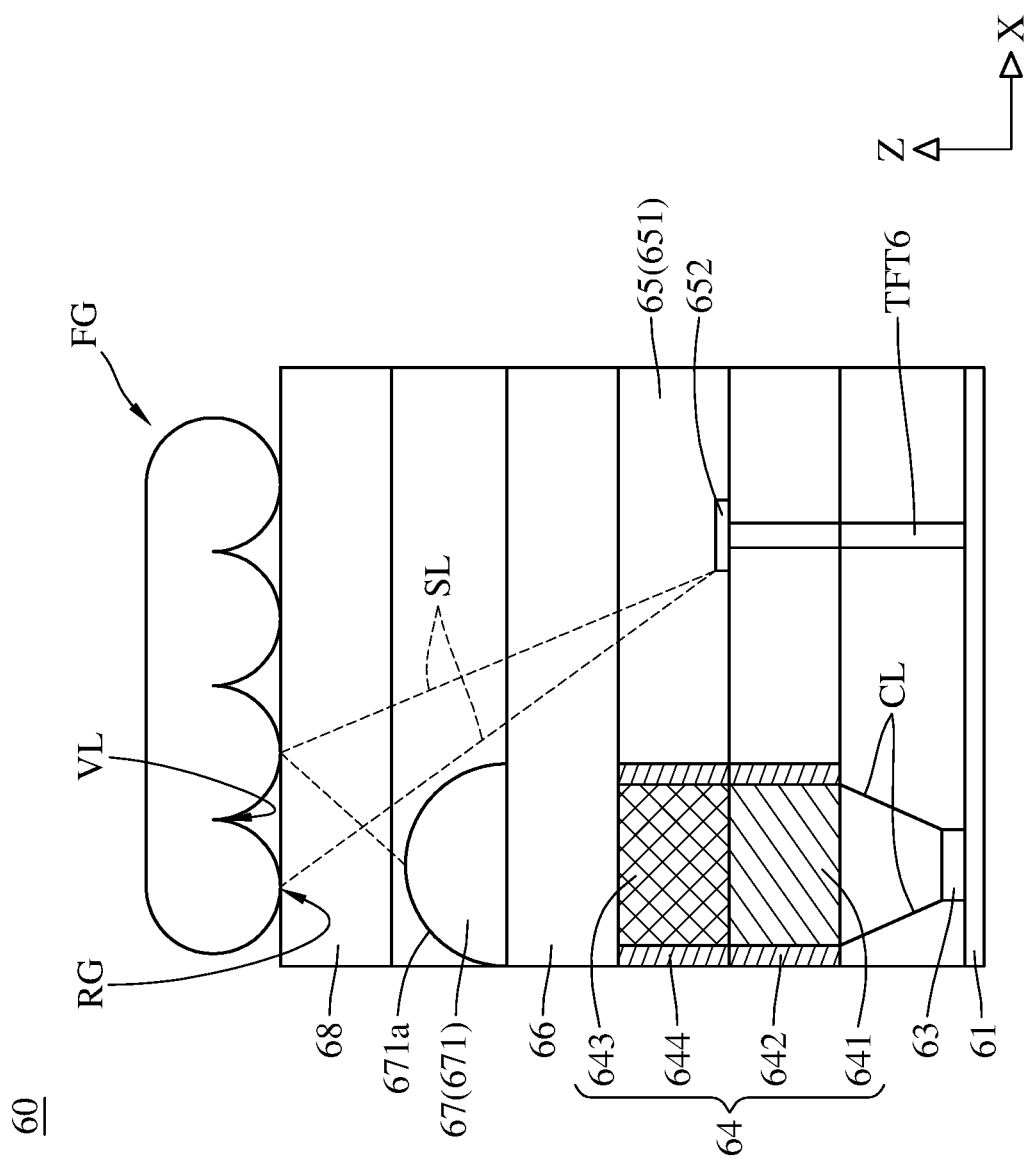
FIG. 6 is a schematic view of an optical fingerprint identification system according to the 6th embodiment of the present disclosure.

Please refer to FIG. 6, which is a schematic view of an optical fingerprint identification system according to the 6th embodiment of the present disclosure. In this embodiment, the optical fingerprint identification system 60 includes a base 61, a photo sensor 63, a condenser unit 64, a light emitting layer 65, a touch layer 66, a light receiving element 67 and a cover 68. The photo sensor 63 is disposed on the base 61 in a stack direction Z. The condenser unit 64 is disposed above the photo sensor 63 in the stack direction Z. The light emitting layer 65 is disposed above the photo sensor 63 and part of the condenser unit 64 in the stack direction Z. The touch layer 66 is disposed above the light emitting layer 65 in the stack direction Z. The light receiving element 67 is disposed above the condenser unit 64, the light emitting layer 65 and the touch layer 66 in the stack direction Z, such that the touch layer 66 is located between the light receiving element 67 and the condenser unit 64. The cover 68 is disposed above the light emitting layer 65 and the light receiving element 67 in the stack direction Z.

Specifically, the condenser unit 64 is located between the photo sensor 63 and the cover 68. The condenser unit 64 includes a medium layer 641 and a reflection layer 642, wherein the reflection layer 642 surrounds the outer rim of the medium layer 641 with a central axis passing through the geometric center of the medium layer 641 in the stack direction Z.

The condenser unit 64 further includes an upper medium layer 643 and an upper reflection layer 644, wherein the upper reflection layer 644 surrounds the outer rim of the upper medium layer 643 with a central axis passing through the geometric center of the upper medium layer 643 in the stack direction Z, and the upper medium layer 643 and the upper reflection layer 644 are located above the medium layer 641 and the reflection layer 642. It is noted that the material of the upper medium layer 643 is different from the material of the medium layer 641, while the material of the upper reflection layer 644 can be the same as the material of the reflection layer 642.

The light receiving element 67 is located between the photo sensor 63 and the cover 68. The light receiving element 67 and the photo sensor 63 are aligned with each other in the stack direction Z. In other words, the light receiving element 67 has an orthographic projection on the photo sensor 63 which is on the base 61. The light receiving element 67 includes a light receiving lens element 671. The light receiving lens element 671 has a convex lens surface 671a facing the cover 68 in the stack direction Z.

The light emitting layer 65 includes a display unit 651, and the display unit 651 includes a light emitting element 652. The light emitting element 652 is disposed away from the photo sensor 63, the condenser unit 64 and the light receiving element 67 in a sideway direction that is different from the stack direction Z. Specifically, the photo sensor 63, the condenser unit 64 and the light receiving element 67 are disposed on the opposite side of the light emitting element 652 in a first direction X that can be viewed as the sideway direction. In addition, the light emitting element 652 is, for example, an organic light emitting diode and thus can be used as a light source to emit red light or green light.

The light emitting element 652 and the base 61 are connected via a thin-film-transistor circuitry structure TFT6, and the light emitting element 652 and the photo sensor 63 are indirectly connected via the thin-film-transistor circuitry structure TFT6 and the base 61.

When a refractive index of the medium layer 641 is nA, and a refractive index of the reflection layer 642 is nR, the following conditions are satisfied: nA=1.85 or 2.42; and nR=1.56.

When a refractive index of the upper medium layer 643 is nB, and a refractive index of the upper reflection layer 644 is nR', the following conditions are satisfied: nB=1.61 or 1.77; and nR'=1.56.

When a refractive index of the light receiving lens element 671 is nL2, and a glass transition temperature value in Celsius scale of a material of the light receiving lens element 671 is Tg2, the following condition is satisfied: 100×nL2/(650−Tg2)=0.68, 0.85, 4.13 or 5.15.

When user's finger FG is placed on the cover 68, the light emitting element 652 can emit a sensing light SL towards the finger FG. Since the finger FG has fingerprint patterns, the finger FG has a valley portion VL and a ridge portion RG on the surface thereof. The sensing light SL can be reflected off the valley portion VL and the ridge portion RG, transmitted to the convex lens surface 671a of the light receiving lens element 671, and then transmitted to the condenser unit 64 to become a converging light CL towards the photo sensor 63. The converging light CL converges on the photo sensor 63 to generate image data, and the image data is transmitted to a processor (not shown). Image data from several optical fingerprint identification systems would be collected to form an image for the processor to perform an identification process.

7th Embodiment

Figure 7:
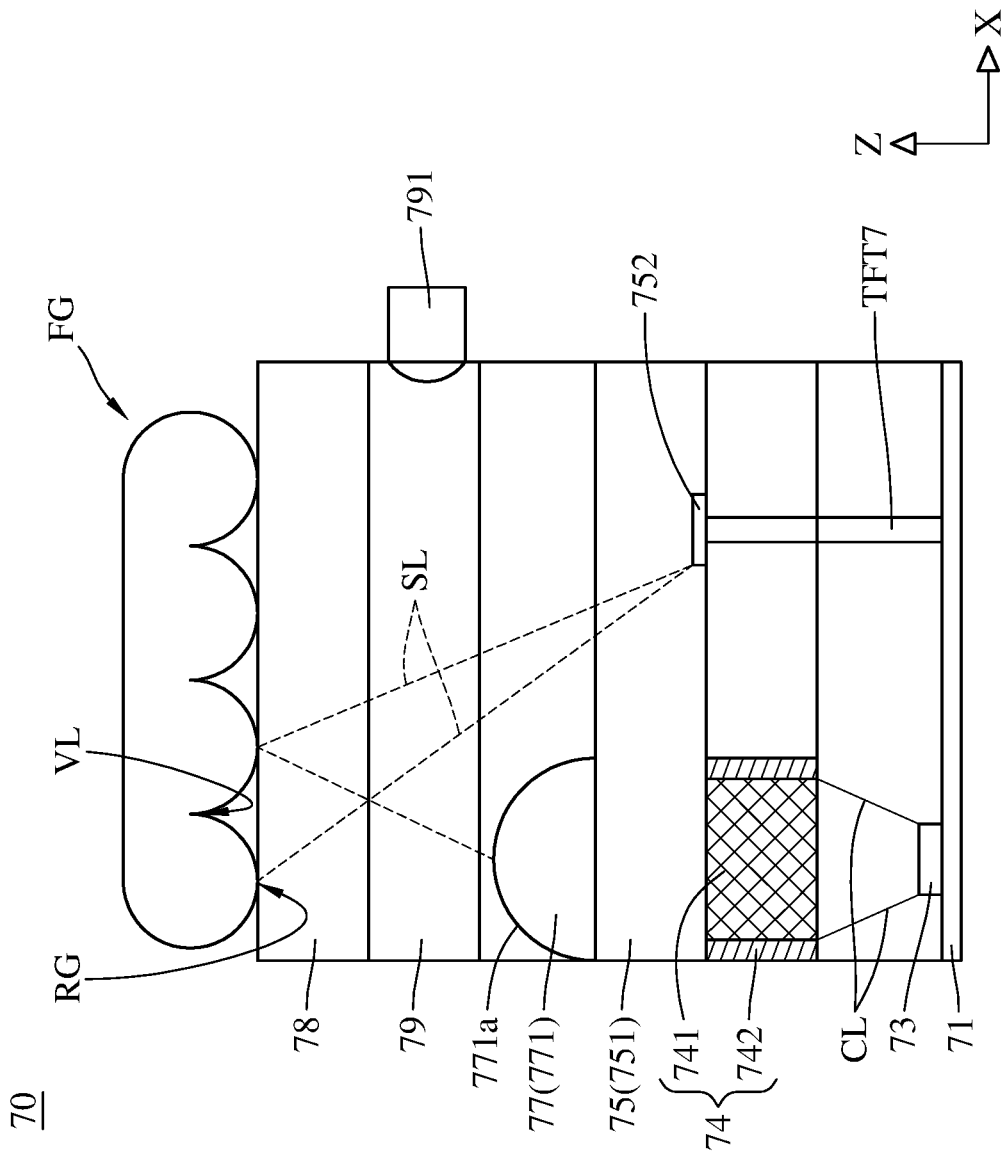
FIG. 7 is a schematic view of an optical fingerprint identification system according to the 7th embodiment of the present disclosure.

Please refer to FIG. 7, which is a schematic view of an optical fingerprint identification system according to the 7th embodiment of the present disclosure. In this embodiment, the optical fingerprint identification system 70 includes a base 71, a photo sensor 73, a condenser unit 74, a light emitting layer 75, a light receiving element 77, a light guiding layer 79 and a cover 78. The photo sensor 73 is disposed on the base 71 in a stack direction Z. The condenser unit 74 is disposed above the photo sensor 73 in the stack direction Z. The light emitting layer 75 is disposed above the photo sensor 73 and the condenser unit 74 in the stack direction Z. The light receiving element 77 is disposed above the condenser unit 74 and the light emitting layer 75 in the stack direction Z. The light guiding layer 79 is disposed above the light emitting layer 75 and the light receiving element 77 in the stack direction Z. The cover 78 is disposed above the light emitting layer 75 and the light guiding layer 79 in the stack direction Z.

Specifically, the condenser unit 74 is located between the photo sensor 73 and the cover 78. The condenser unit 74 includes a medium layer 741 and a reflection layer 742, wherein the reflection layer 742 surrounds the outer rim of the medium layer 741 with a central axis passing through the geometric center of the medium layer 741 in the stack direction Z.

The light receiving element 77 is located between the photo sensor 73 and the cover 78. The light receiving element 77 and the photo sensor 73 are aligned with each other in the stack direction Z. In other words, the light receiving element 77 has an orthographic projection on the photo sensor 73 which is on the base 71. The light receiving element 77 includes a light receiving lens element 771. The light receiving lens element 771 has a convex lens surface 771a facing the cover 78 in the stack direction Z.

The light emitting layer 75 includes a display unit 751, and the display unit 751 includes a light emitting element 752. The light emitting element 752 is disposed away from the photo sensor 73, the condenser unit 74 and the light receiving element 77 in a sideway direction that is different from the stack direction Z. Specifically, the photo sensor 73, the condenser unit 74 and the light receiving element 77 are disposed on the opposite side of the light emitting element 752 in a first direction X that can be viewed as the sideway direction. In addition, the light emitting element 752 is, for example, an organic light emitting diode and thus can be used as a light source to emit red light or green light.

The light emitting element 752 and the base 71 are connected via a thin-film-transistor circuitry structure TFT7, and the light emitting element 752 and the photo sensor 73 are indirectly connected via the thin-film-transistor circuitry structure TFT7 and the base 71.

When a refractive index of the medium layer 741 is nA, and a refractive index of the reflection layer 742 is nR, the following conditions are satisfied: nA=1.61, 1.77, 1.85 or 2.42; and nR=1.56.

When a refractive index of the light receiving lens element 771 is nL2, and a glass transition temperature value in Celsius scale of a material of the light receiving lens element 771 is Tg2, the following condition is satisfied: 100×nL2/(650−Tg2)=0.68, 0.85, 4.13 or 5.15.

When user's finger FG is placed on the cover 78, the light emitting element 752 can emit a sensing light SL towards the finger FG. Since the finger FG has fingerprint patterns, the finger FG has a valley portion VL and a ridge portion RG on the surface thereof. The sensing light SL can be reflected off the valley portion VL and the ridge portion RG, transmitted to the convex lens surface 771a of the light receiving lens element 771, and then transmitted to the condenser unit 74 to become a converging light CL towards the photo sensor 73. The converging light CL converges on the photo sensor 73 to generate image data, and the image data is transmitted to a processor (not shown). Image data from several optical fingerprint identification systems would be collected to form an image for the processor to perform an identification process.

Additionally, the light guiding layer 79 further includes a secondary light emitting element 791. The secondary light emitting element 791 can emit a secondary sensing light (not shown) to replace or enhance the sensing light SL generated by the light emitting element 752. Part of the secondary sensing light would pass through the cover 78, be reflected and then be transmitted to become secondary converging light (not shown) towards the photo sensor 73. The secondary converging light can also converge on the photo sensor 73 to generate image data or to enhance image quality of the image data generated by the converging light CL to be transmitted to the abovementioned processor. Image data from several optical fingerprint identification systems would be collected to form an image for the processor to perform an identification process.

8th Embodiment

Figure 8:
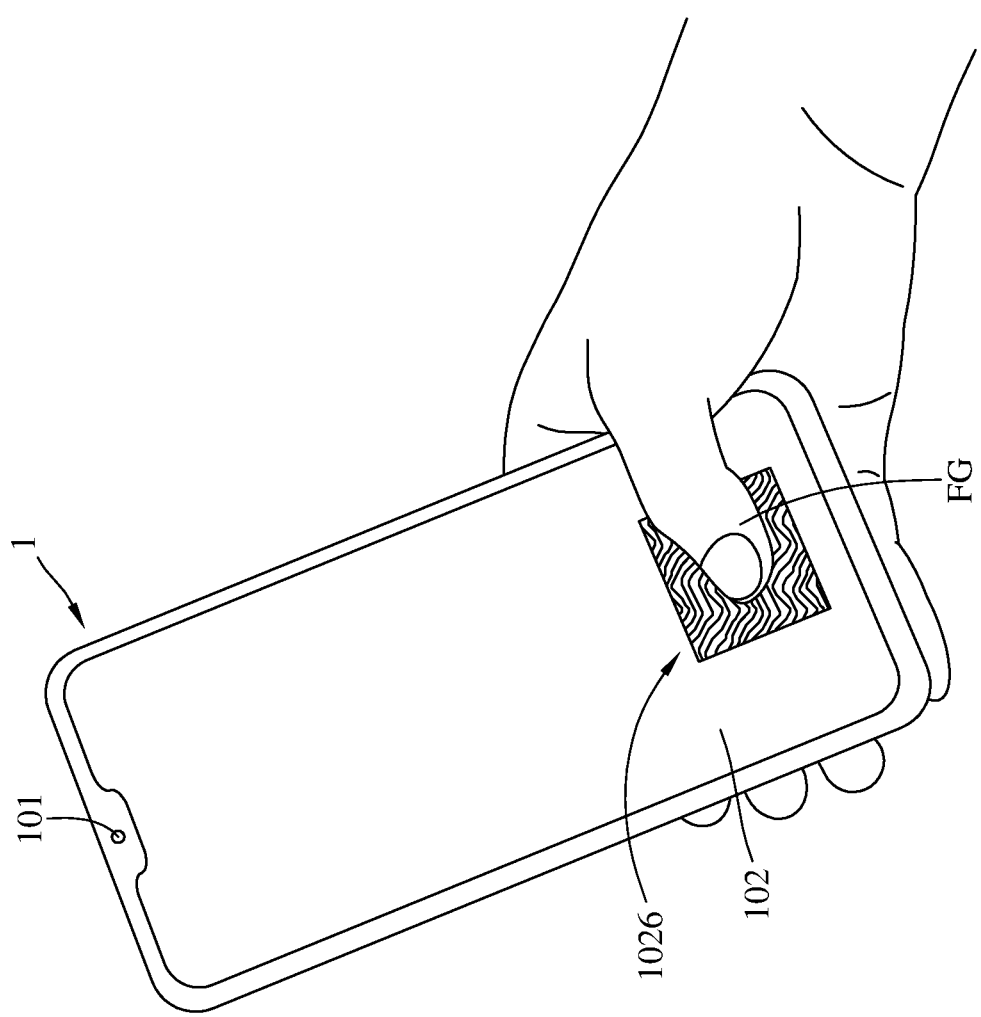
FIG. 8 is a schematic view showing a usage scenario of an optical fingerprint identification device according to the 8th embodiment of the present disclosure.
Figure 9:
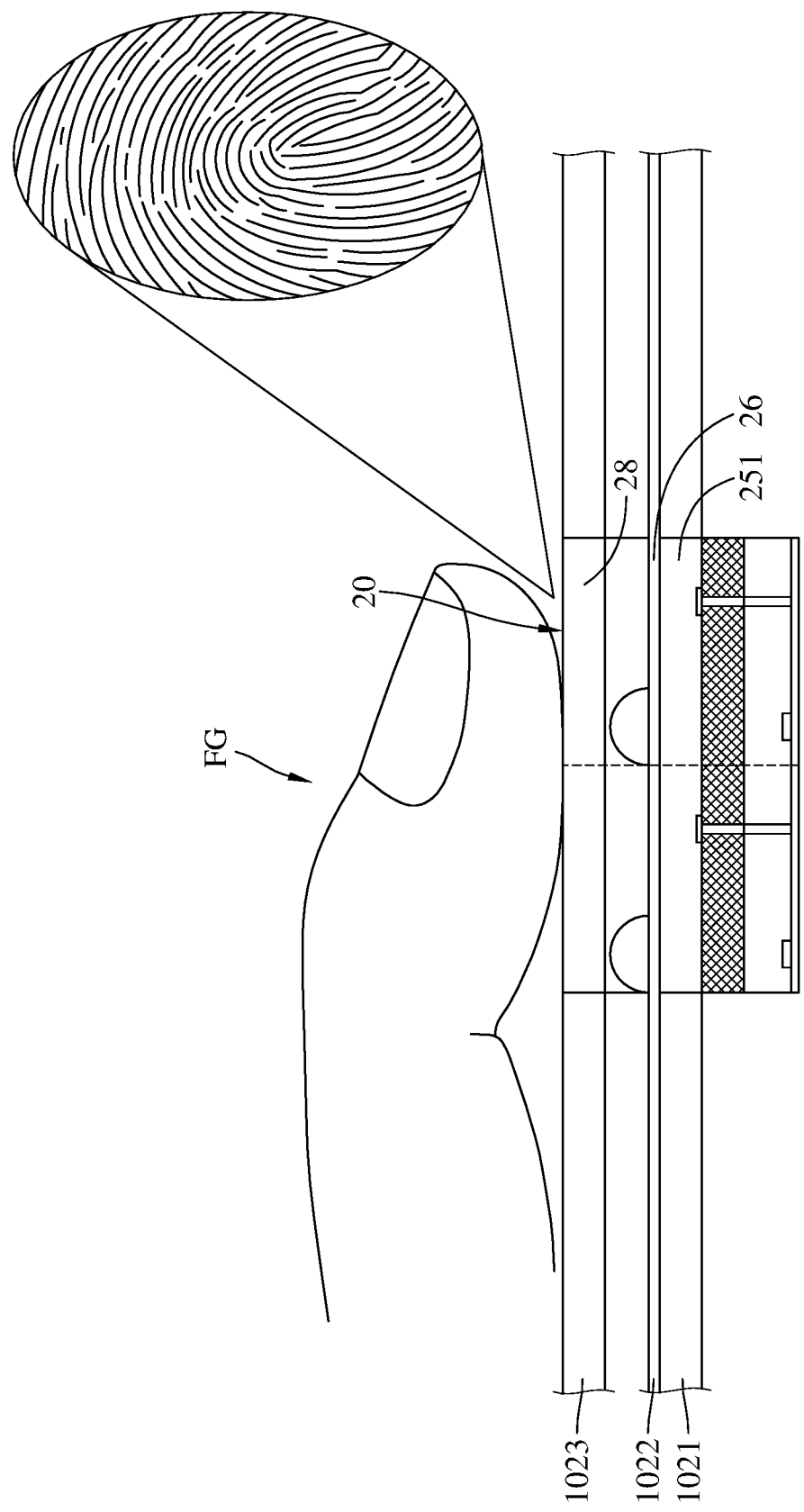
FIG. 9 is a schematic view showing that the optical fingerprint identification device of FIG. 8 is identifying a fingerprint.

Please refer to FIG. 8 and FIG. 9, where FIG. 8 is a schematic view showing a usage scenario of an optical fingerprint identification device according to the 8th embodiment of the present disclosure, and FIG. 9 is a schematic view showing that the optical fingerprint identification device of FIG. 8 is identifying a fingerprint.

In this embodiment, an electronic device 1 is a smartphone having a function of biometrics identifications. The electronic device 1 includes an image capturing module 101 and a display module 102. The image capturing module 101 is a front-facing camera of the electronic device 1 for taking selfies. The display module 102 includes a screen display layer 1021, a touch screen layer 1022 and a transparent plate 1023. The screen display layer 1021 can display images. Moreover, the screen display layer 1021 can use OLEDs or active-matrix organic light-emitting diode (AMOLEDs). The touch screen layer 1022 is integrated in the structure of the screen display layer 1021 and thus located in the same layer as the screen display layer 1021. Moreover, the touch screen layer 1022 can have a touch screen function, such that an additional input device can be omitted and the electronic device 1 can be used intuitively. The transparent plate 1023 is disposed above the touch screen layer 1022. Moreover, the transparent plate 1023 can provide a protection function, such that an additional protection component can be omitted. In addition, the display module 102 further includes an optical fingerprint identification device 1026. The optical fingerprint identification device 1026 includes a plurality of optical fingerprint identification systems 20 disclosed in the 2nd embodiment. It is noted that only two optical fingerprint identification systems 20 are illustrated in FIG. 9 for schematic purpose, and the optical fingerprint identification systems 20 and the finger FG in FIG. 9 are not in their actual proportion. As described in the 2nd embodiment, the optical fingerprint identification system 20 provides a fingerprint identification function; moreover, the display unit 251 included in the optical fingerprint identification system 20 can further provide an image display function, the touch layer 26 included in the optical fingerprint identification system 20 can further provide a touch screen function, and the cover 28 included in the optical fingerprint identification system 20 can further provide a protection function. The optical fingerprint identification device 1026 may alternatively be provided with the optical fingerprint identification system disclosed in other embodiments, and the present disclosure is not limited thereto.

Figure 11:
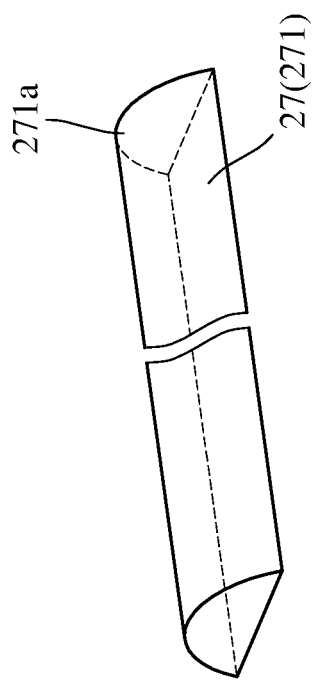
FIG. 11 is a perspective view of a light receiving element of the optical fingerprint identification device of FIG. 10.
Figure 10:
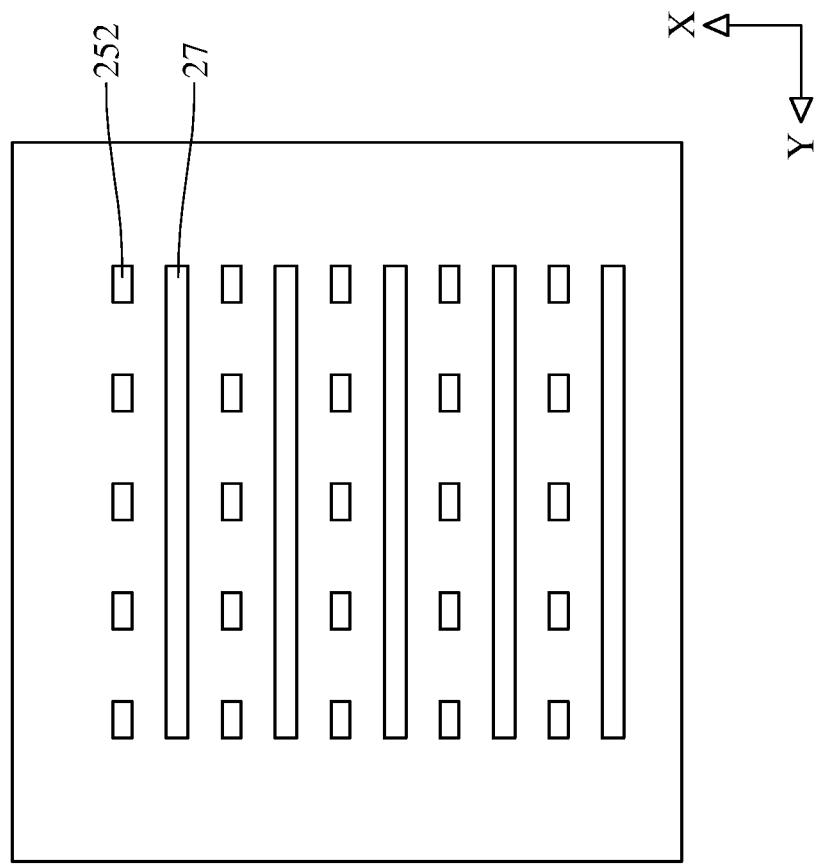
FIG. 10 is a top schematic view showing the configuration of the optical fingerprint identification device of FIG. 8.
Figure 12:
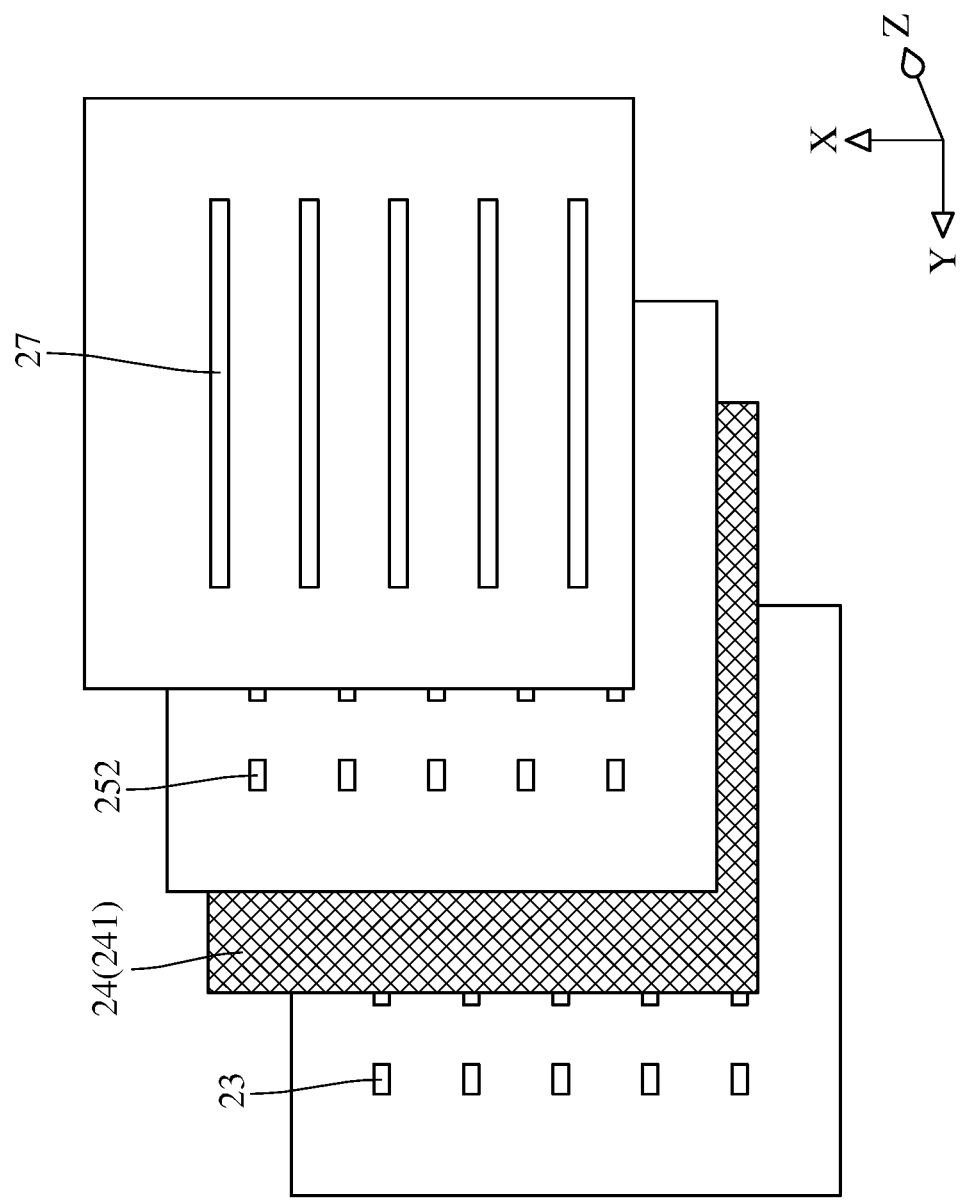
FIG. 12 is an exploded view of the optical fingerprint identification device of FIG. 10.

Please refer to FIG. 10 to FIG. 12, where FIG. 10 is a top schematic view showing the configuration of the optical fingerprint identification device of FIG. 8, FIG. 11 is a perspective view of a light receiving element of the optical fingerprint identification device of FIG. 10, and FIG. 12 is an exploded view of the optical fingerprint identification device of FIG. 10.

The optical fingerprint identification device 1026 includes the plurality of light receiving elements 27, the plurality of light emitting elements 252, the condenser layer 24 and the plurality of photo sensors 23. As shown in FIG. 11, the light receiving element 27 includes the light receiving lens element 271 that is in an elongated shape and has the convex lens surface 271a. As shown in FIG. 12, the light receiving elements 27 are located above the light emitting elements 252 in the stack direction Z. As shown in FIG. 10 and FIG. 12, the light receiving elements 27 are disposed at equal intervals in the first direction X, and each of the light receiving elements 27 is located between adjacent units of the light emitting elements 252 in the first direction X. The light emitting elements 252 are disposed at equal intervals respectively in the first direction X and a second direction Y, wherein the second direction Y is substantially perpendicular to the first direction X and the stack direction Z. Since the medium 241 is substantially distributed to the overall condenser layer 24, the condenser layer 24 can be referred as a condenser medium layer. The photo sensors 23 are located below the light emitting elements 252 in the stack direction Z, and the photo sensors 23 are disposed at equal intervals in the first direction X. Specifically, each of the photo sensors 23 is located between adjacent units of the light emitting elements 252 in the first direction X. The photo sensors 23 are aligned with the light receiving elements 27 in the stack direction Z so as to receive the converging light CL from the light receiving elements 27 to be imaged thereon.

In this embodiment, the arrangement of the light receiving elements 27 and the light emitting elements 252 shown in FIG. 10 is not intended to restrict the present disclosure. There are more arrangements provided in the 9th through the 11th embodiments.

9th Embodiment

Figure 13:
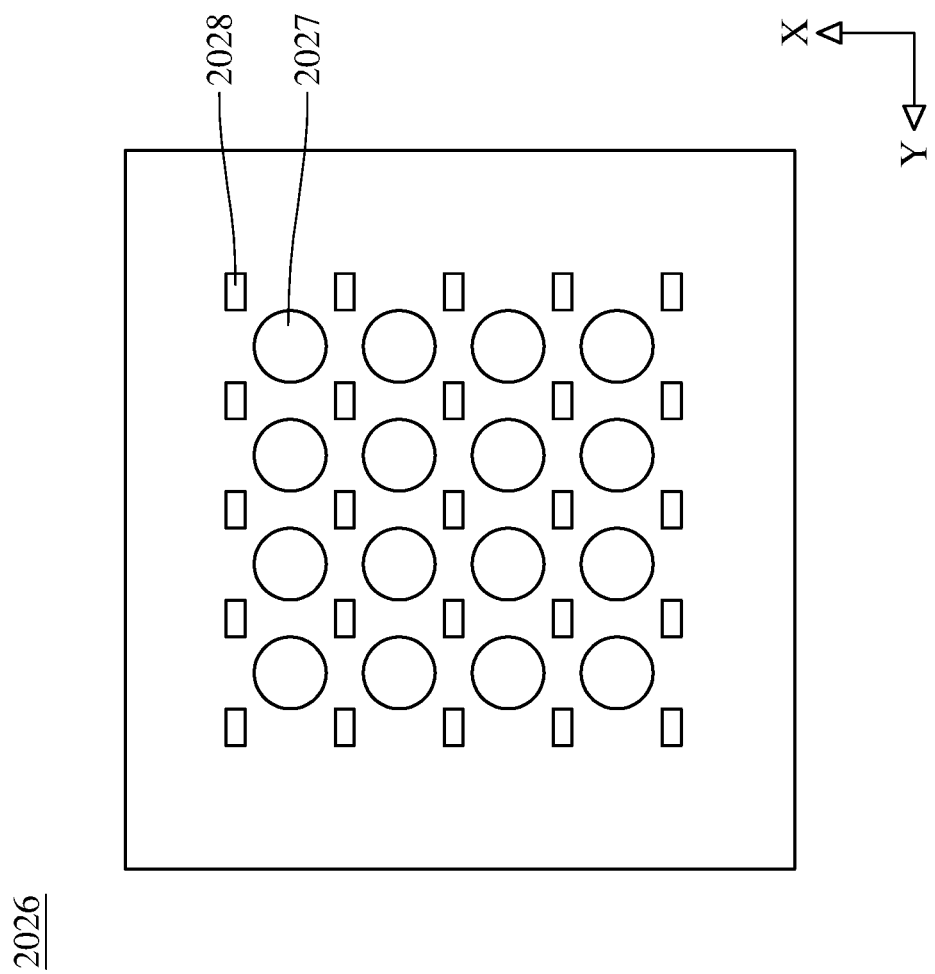
FIG. 13 is a top schematic view showing the configuration of an optical fingerprint identification device according to the 9th embodiment of the present disclosure.

Please refer to FIG. 13, which is a top schematic view showing the configuration of an optical fingerprint identification device according to the 9th embodiment of the present disclosure. Differences between this embodiment and the previous embodiments are illustrated hereinafter. The optical fingerprint identification device 2026 includes a plurality of light receiving elements 2027 and a plurality of light emitting elements 2028.

The light receiving elements 2027 are convex lens elements. The light receiving elements 2027 are disposed at equal intervals respectively in the first direction X and the second direction Y. The light emitting elements 2028 are disposed at equal intervals respectively in the first direction X and the second direction Y. Each of the light receiving elements 2027 is located between adjacent units of the light emitting elements 2028 respectively in the first direction X and the second direction Y. The light receiving elements 2027 and the light emitting elements 2028 are not aligned with each other and alternatively arranged respectively in the first direction X and the second direction Y.

10th Embodiment

Figure 14:
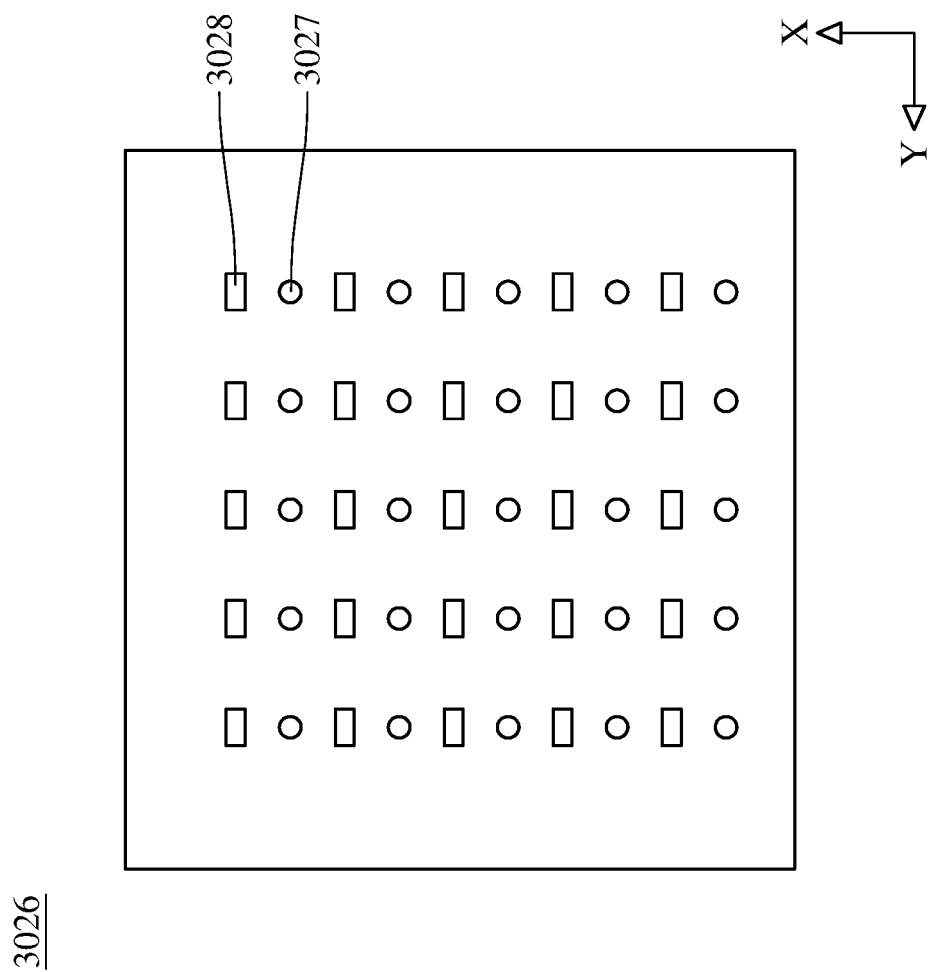
FIG. 14 is a top schematic view showing the configuration of an optical fingerprint identification device according to the 10th embodiment of the present disclosure.

Please refer to FIG. 14, which is a top schematic view showing the configuration of an optical fingerprint identification device according to the 10th embodiment of the present disclosure. Differences between this embodiment and the previous embodiments are illustrated hereinafter. The optical fingerprint identification device 3026 includes a plurality of light receiving elements 3027 and a plurality of light emitting elements 3028.

The light receiving elements 3027 are convex lens elements. The light receiving elements 3027 are disposed at equal intervals respectively in the first direction X and the second direction Y. The light emitting elements 3028 are disposed at equal intervals respectively in the first direction X and the second direction Y. The light receiving elements 3027 and the light emitting elements 3028 are aligned with each other and alternatively arranged in the first direction X.

11th Embodiment

Figure 15:
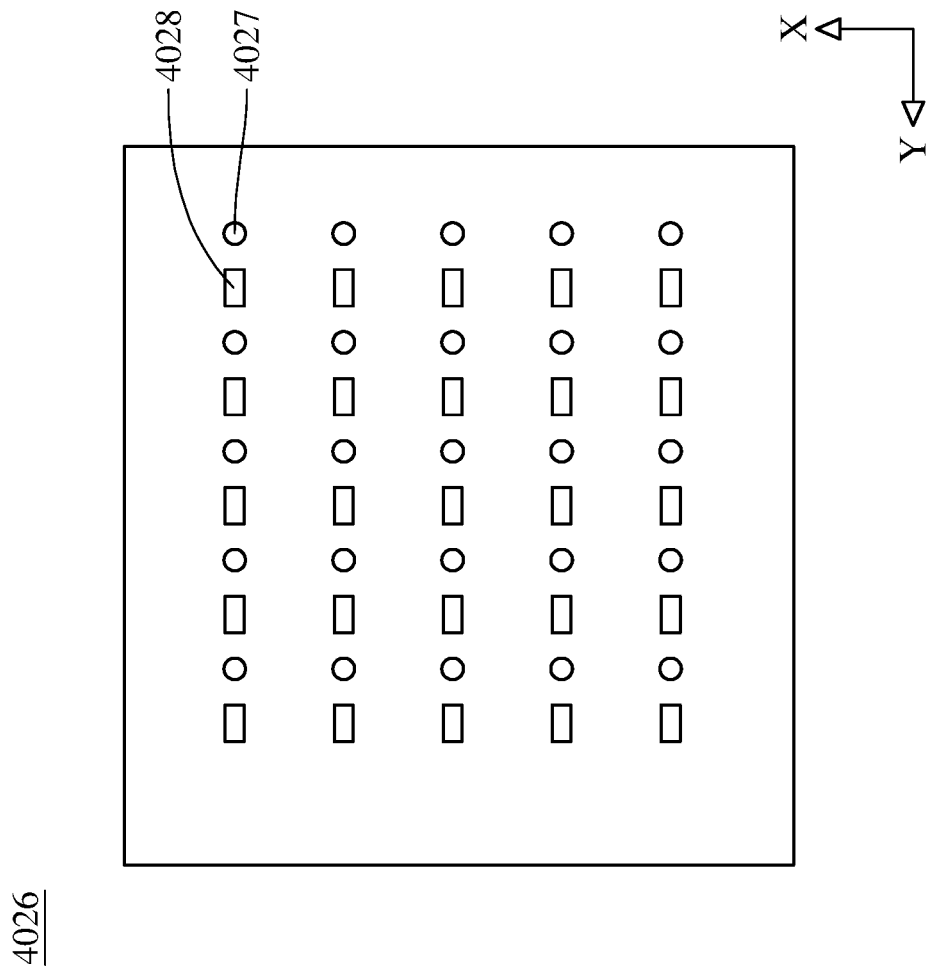
FIG. 15 is a top schematic view showing the configuration of an optical fingerprint identification device according to the 11th embodiment of the present disclosure.

Please refer to FIG. 15, which is a top schematic view showing the configuration of an optical fingerprint identification device according to the 11th embodiment of the present disclosure. Differences between this embodiment and the previous embodiments are illustrated hereinafter. The optical fingerprint identification device 4026 includes a plurality of light receiving elements 4027 and a plurality of light emitting elements 4028.

The light receiving elements 4027 are convex lens elements. The light receiving elements 4027 are disposed at equal intervals respectively in the first direction X and the second direction Y. The light emitting elements 4028 are disposed at equal intervals respectively in the first direction X and the second direction Y. The light receiving elements 4027 and the light emitting elements 4028 are aligned with each other and alternatively arranged in the second direction Y.

The smartphone in the present disclosure is only exemplary for showing the optical fingerprint identification systems 10-70 and the optical fingerprint identification devices 1026-4026 of the present disclosure installed in an electronic device for providing the in-display fingerprint identification function, and the present disclosure is not limited thereto. Furthermore, the optical fingerprint identification systems 10-70 and the optical fingerprint identification devices 1026-4026 feature good capability in aberration corrections and high image quality, and can be applied to tablets, portable video recorders, multi-camera devices and other electronic imaging devices.

The foregoing description, for the purpose of explanation, has been described with reference to specific embodiments. It is to be noted that the present disclosure shows different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An optical fingerprint identification system, comprising:
    a base;
    a photo sensor, disposed on the base;
    a light emitting layer, disposed above the photo sensor, wherein the light emitting layer comprises a light emitting element; and
    a cover, disposed above the light emitting layer;
    wherein the optical fingerprint identification system further comprises:
        a condenser unit, disposed above the photo sensor; and
        a light receiving element, disposed above the condenser unit;
        wherein the condenser unit and the light receiving element are located between the photo sensor and the cover;
        wherein the condenser unit has refractive power, the light receiving element has refractive power or is a filter, and the condenser unit is located between the photo sensor and the light receiving element;
        wherein the light emitting element is disposed away from the photo sensor, the condenser unit and the light receiving element in a sideway direction that is different from a stack direction of the optical fingerprint identification system.

2. The optical fingerprint identification system of claim 1, wherein the light receiving element comprises a light interference filter layer and a light absorption filter layer, the light interference filter layer is configured to provide a filter bandwidth shift according to a change of an incident light angle thereon, and the light absorption filter layer is a light passable filter layer.

3. The optical fingerprint identification system of claim 2, wherein the light absorption filter layer has a light passing bandwidth ranging from visible to near-infrared spectrum, a full width at half maximum of the light passing bandwidth of the light absorption filter layer is FWHM, and the following condition is satisfied:
    $FWHM < 100$ [nm].

4. The optical fingerprint identification system of claim 1, wherein the light receiving element comprises a light receiving lens element and a light interference filter medium layer, the light receiving lens element comprises a light absorption material being a light passing filter material, the light interference filter medium layer is located on a lens surface of the light receiving lens element, and the light interference filter medium layer is configured to provide a filter bandwidth shift according to a change of an incident light angle thereon.

5. The optical fingerprint identification system of claim 1, wherein the condenser unit comprises a medium layer and a reflection layer, and the reflection layer surrounds an outer rim of the medium layer.

6. The optical fingerprint identification system of claim 5, wherein a refractive index of the medium layer is nA, and the following condition is satisfied:
    $1.60 < nA < 5.0$.

7. The optical fingerprint identification system of claim 5, wherein a refractive index of the medium layer is nA, a refractive index of the reflection layer is nR, and the following condition is satisfied:
    $nR < nA$.

8. The optical fingerprint identification system of claim 5, wherein the condenser unit further comprises an upper medium layer and an upper reflection layer, the upper reflection layer surrounds an outer rim of the upper medium layer, and the upper medium layer and the upper reflection layer are located above the medium layer and the reflection layer.

9. The optical fingerprint identification system of claim 8, wherein a refractive index of the medium layer is nA, a refractive index of the upper medium layer is nB, and the following condition is satisfied:
    $nB < nA$.

10. The optical fingerprint identification system of claim 1, wherein the condenser unit comprises a condenser lens element, a refractive index of the condenser lens element is nL1, and the following condition is satisfied:
    $1.60 < nL1 < 2.50$.

11. The optical fingerprint identification system of claim 10, wherein the light receiving element comprises a light receiving lens element, the refractive index of the condenser lens element is nL1, a refractive index of the light receiving lens element is nL2, a refractive index of one of the condenser lens element and the light receiving lens element is nLi, a glass transition temperature value in Celsius scale of a material of the condenser lens element is Tg1, a glass transition temperature value in Celsius scale of a material of the light receiving lens element is Tg2, a glass transition temperature value in Celsius scale of a material of one of the condenser lens element and the light receiving lens element is Tgi, and at least one of the condenser lens element and the light receiving lens element satisfies the following condition:

0<1.00×nLi/(650−Tgi)<8, wherein i=1 or 2.

12. The optical fingerprint identification system of claim 1, further comprising a light guiding layer disposed above the light emitting layer.

13. The optical fingerprint identification system of claim 1, wherein the light emitting element is configured to emit red light or green light.

14. The optical fingerprint identification system of claim 1, wherein the light receiving element and the photo sensor are aligned with each other in the stack direction of the optical fingerprint identification system.

15. The optical fingerprint identification system of claim 1, wherein the light emitting element is disposed at an opposite side of the photo sensor, the condenser unit and the light receiving element.

16. The optical fingerprint identification system of claim 1, wherein the light emitting layer further comprises a display unit, the display unit comprises the light emitting element, and the light emitting element is an organic light emitting diode.

17. The optical fingerprint identification system of claim 1, wherein the photo sensor and the light emitting element are connected via a thin-film-transistor circuitry structure.

18. The optical fingerprint identification system of claim 1, further comprising a touch layer located between the light receiving element and the condenser unit.

19. An optical fingerprint identification device, comprising:
a plurality of light emitting elements, wherein the plurality of light emitting elements are disposed at equal intervals respectively in a first direction and a second direction, and the first direction is substantially perpendicular to the second direction;
a plurality of light receiving elements, wherein the plurality of light receiving elements are located above the plurality of light emitting elements in a stack direction of the optical fingerprint identification device, the stack direction is substantially perpendicular to the first direction and the second direction, the plurality of light receiving elements are disposed at equal intervals in the first direction, and each of the plurality of light receiving elements is located between adjacent two of the plurality of light emitting elements in the first direction; and
a plurality of photo sensors, wherein the plurality of photo sensors are located below the plurality of light emitting elements in the stack direction, the plurality of photo sensors are disposed at equal intervals in the first direction, and each of the plurality of photo sensors is located between adjacent two of the plurality of light emitting elements in the first direction.

20. The optical fingerprint identification device of claim 19, wherein the plurality of light receiving elements and the plurality of photo sensors are aligned with each other in the stack direction.

21. The optical fingerprint identification device of claim 19, further comprising a condenser medium layer located above the plurality of photo sensors in the stack direction.

* * * * *